United States Patent [19]

Tajima et al.

[11] Patent Number: 5,001,996
[45] Date of Patent: Mar. 26, 1991

[54] EMBROIDERING MACHINE

[75] Inventors: Ikuo Tajima; Hideo Hasegawa, both of Kasugai, Japan

[73] Assignee: Tokai Kogyo Mishin Kabushiki Kaisha, Kasugai, Japan

[21] Appl. No.: 222,100

[22] Filed: Jul. 20, 1988

[30] Foreign Application Priority Data

Jul. 22, 1987 [JP] Japan .................... 62-181196
Aug. 19, 1987 [JP] Japan .................... 62-204184
Sep. 17, 1987 [JP] Japan .................... 62-231177
Oct. 2, 1987 [JP] Japan .................... 62-248121

[51] Int. Cl.$^5$ .................... D05C 5/04; D05B 21/00
[52] U.S. Cl. .................................... 112/103
[58] Field of Search ............ 112/103, 102, 121.12, 112/121.11, 266.1, 262.3, 454, 456, 458, 445, 78, 98; 364/470

[56] References Cited

U.S. PATENT DOCUMENTS 4,453,477  6/1984  Gerber ........................ 112/121.12
4,622,907  11/1986 Kimura ........................ 112/103 X
4,821,662  4/1989  Pongrass et al. ............. 112/103 X Primary Examiner—Peter Nerbun
Attorney, Agent, or Firm—Spensley Horn Jubas & Lubitz

[57] ABSTRACT

Control data such as data designating the order of changing color of thread, conversion parameter designating reducing or enlarging of an embroidery design and data designating the number of repetitions of the same design are set to desired states and these control data are stored in a memory in correspondence to storage of stitch data of a desired embroidery design. By designating a desired embroidery design when this embroidery design should be embroidered, the control data stored in correspondence to this design are read from the memory and controlling of the embroidering operation and changing of stitch data are made in accordance with the read out data. When stitch data of an embroidery design is input from an external memory device to an internal memory device, stitch data of plural embroidery designs can be combined into stitch data of a single embroidery design and this combined stitch data can be stored in the internal memory device. Further, for editing the embroidery design, running of the embroidering machine can be temporarily stopped at a desired stitch during running for actual embroidering operation to change the operation mode to an embroidery design data editing mode while confirming an actually embroidered design pattern. During this temporary stopping, data editing processing such as changing, deletion or insertion of stitch data at the desired stitch is executed.

3 Claims, 24 Drawing Sheets

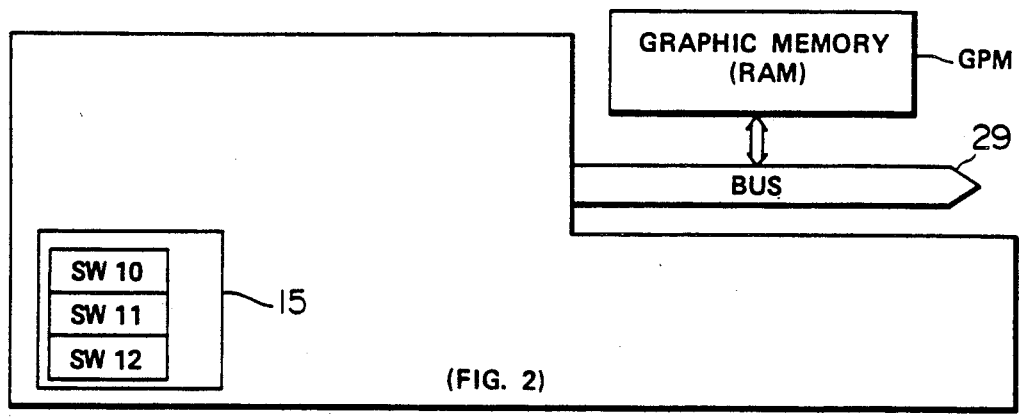
FIG.24
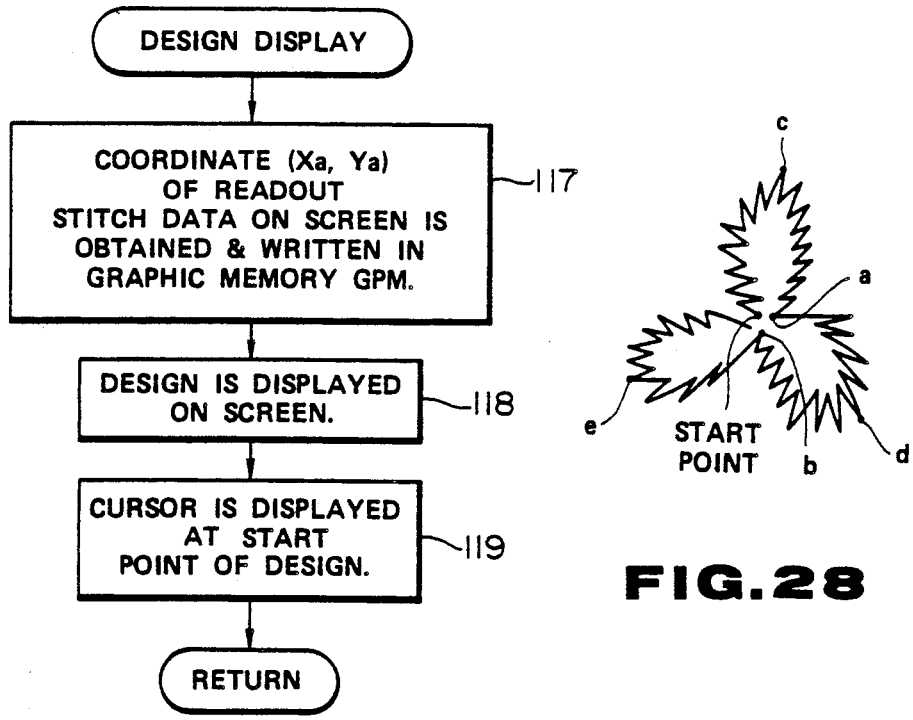
FIG.26
FIG.28

EMBROIDERING MACHINE

BACKGROUND OF THE INVENTION

This invention relates to an embroidering machine capable of storing stitch data for realizing an embroidering operation corresponding to an embroidery design for each embroidery design, storing respective control data for changing the stitch data or for controlling the embroidery operation associated with the stitch data and reading out stitch data and control data for a desired embroidery design to perform execution and control of the embroidering operation in accordance with the read out data.

The invention relates also to an embroidering machine having stitch data memory means capable of reading and writing for storing stitch data corresponding to an embroidery design and reading stitch data for a desired embroidery design from this stitch data memory means for controlling the embroidering operation and, more particularly, to an embroidering machine capable of combining plural sets of stitch data separately recorded in an external recording device such as a paper tape into stitch data of a single continuous design and storing and reading this stitch data in and from the stitch data memory means.

The invention relates also to an embroidering machine capable of performing data editing such as change, deletion and insertion with respect to stitch data of an embroidery design stored in a memory at a desired stitch thereof and, more particularly, to an embroidering machine capable of temporarily stopping rotation of the embroidering machine main shaft at a stitch of the embroidery design in the course of the embroidering operation and executing data editing with respect to a desired stitch associated with the stitch at which the rotation has stopped thereby enabling data editing in a simple manner while confirming the actual embroidery design.

The invention relates also to an embroidering machine capable of performing data editing such as change or modification with respect to stitch data at a desired stitch in an embroidery design and, more particularly, to an embroidering machine capable of displaying a desired embroidery design on a screen of a display and changing or setting with respect to a desired stitch of the stitch data while confirming the embroidery design on the screen of the display.

The invention relates also to an embroidering machine having a communication interface and, more particularly, to an embroidering machine capable of transmitting and receiving stitch data for realizing the embroidering operation and respective control data for controlling the embroidering operation associated with this stitch data between the embroidering machine and an external device such as a computer having a communication function.

In an automatic embroidering machine, stitch data for various embroidery designs are stored in an external device such as a paper tape, the external device such as a paper tape storing stitch data for a desired embroidery design is set and this stitch data is transferred to a memory in the embroidering machine and stored therein. Data stored in the external device as data associated with the embroidery design has heretofore been only stitch data for realizing an embroidering operation corresponding to the embroidery design (this stitch data is data concerning an embroidering operation for one stitch including X, Y data designating the moving amount of an embroidery frame for each stitch and function data designating operations of the embroidering machine such as changing of color of thread, stopping of the embroidering machine main shaft and jump at required stitches) and this stitch data is transferred to the internal memory and stored therein. In the automatic embroidering design, stitch data stored in the internal memory is read out and the embroidering operation is executed in accordance with the read out data.

The automatic embroidering machine can also store such stitch data with respect to plural embroidery designs in its internal memory and read out stitch data for a desired embroidery design selectively from the stored stitch data.

It is a recent tendency in automatic embroidering machines to have various functions concerning changing of an embroidery design or control of an embroidering operation. Such changing and controlling functions include:

(1) designation of order of changing color of thread (2) conversion of X, Y data designating X, Y moving amount of the embroidery frame in stitch data in accordance with parameters designating reducing, enlarging or rotation for reducing, enlarging or rotating the embroidery design (3) selection of running/rest of each embroidering machine head in a multi-head type embroidering machine (4) designation of order of stitching of an embroidery design when plural embroidery designs are combined and embroidered into a continuous design (5) repeating of stitching operation of the same embroidery design (6) setting of the offset amount of the embroidery frame in accordance with the mounting postion of a boring knife when a needle position at which the boring knife is mounted has been selected.

In the prior art embroidering machines, setting of such data concerning changing and controlling functions is made only by setting means provided in the embroidering machine and the operation of the embroidering machine is directly controlled in accordance with contents set by this setting means. In other words, data concerning the changing and controlling functions are set as data belonging exclusively to the embroidering machine and are treated as irrelevant to stitch data for each embroidery design. If, accordingly, it is desired to set data concerning changing and controlling functions in relation to an embroidery design, data concerning desired changing and controlling functions must be set by setting means before the embroidering operation for each embroidery design is made each time.

For this reason, each time a design to be embroidered is changed, data concerning desired changing and controlling functions must be set again. This involves a troublesome operation and therefore is burdensome to the operator of the embroidering machine.

It is also a recent tendency in automatic embroidering machines that the size of design to be embroidered and the number of colors used increase with a result that the amount of stitch data for an embroidery design also increases. Since memory capacity of a normal paper tape is about seventy thousand stitches at the maximum, in a case where this stitch data is recorded on a paper tape used as an external memory device, stitch data exceeding this memory capacity must be divided into plural data and recorded separately on plural paper tapes. In the prior art embroidering machines, a series of stitch data is picked up by a paper tape input device from the plural paper tapes each as a set of stitch data and stored in the memory of the embroidering machine and the embroidering operation is performed for each set of stitch data. There is also a prior art embroidering machine which has a data memory capable of reading and writing and storing stitch data of plural designs and has a memory editing function for editing stitch data of the plural designs stored in the data memory. In this embroidering machine, stitch data of plural designs stored in the data memory are connected together into stitch data of a series of designs by utilizing the memory editing function and the embroidering operation is performed in accordance with this stitch data.

In the above described prior art embroidering machine in which a series of stitch data are divided and recorded on plural paper tapes and these data are input respectively as a set of stitch data from the paper tape input device and stored in the memory of the embroidering machine for enabling the embroidering operation to be performed with respect to each set of stitch data, changing of the embroidery design is required as many times as the number of stitch data recorded on the paper tapes for embroidering the series of designs. This changing operation is troublesome because control data must be set for each corresponding stitch data for which stitching is to be executed and hence poses a problem in realizing an efficient embroidering work. In the automatic embroidering machine having the memory editing function, it is a troublesome work to edit plural stitch data stored in the data memory and, besides, an extra construction is required for realizing the memory editing function with resulting increase in the manufacturing cost.

In a case where contents of stitch data stored in the data memory are to be changed in the prior art automatic embroidering machine, such changing operation is executed in an editing work mode provided exclusively for this purpose which is entirely different from a running operation mode for executing actual embroidering operation. If, therefore, it is desired to perform the data editing after confirming the actual embroidering design, the embroidering machine must be operated once in the running operation mode to execute the embroidering operation from the start position of the embroidery design and thereafter the operation mode must be switched to the exclusively provided editing work mode to execute a desired data editing processing.

Thus, in the prior art embroidering machine, for changing contents of stitch data stored in the data memory, the operation mode of the embroidering machine must be set to a special editing work mode so that changing of contents of stitch data cannot be made while the running operation mode is continued in the course of the embroidering operation. For changing contents of the stitch data, by way of example, actual embroidering operation is executed over the entire design in accordance with the stitch data and parts of the embroidery where changing or modification is necessary are established by confirming the completed embroidery design and then the operation mode of the embroidering machine is changed to a special editing work mode for executing an editing work for changing or modifying the stitch data of required parts. Further, for confirming the edited stitch data, the operation mode of the embroidering machine is changed to the running operation mode to start the embroidering operation from the start position of the embroidery design. Accordingly, the editing work is separated from the embroidering operation and design confirming operation with a result that the embroidery work as a whole becomes complicated requiring skill and time.

Further, in the prior art embroidering machine, an operation for changing and controlling stitch data is made only by setting means provided in the embroidering machine and the operation of the embroidering machine is controlled directly by contents set by this setting means. In other words, data concerning changing and controlling functions is set as data exclusively belonging to the embroidering machine so that data concerning desired changing and controlling functions must be set by the setting means each time before the embroidering operation of each embroidery design is made.

There is also proposed an automatic embroidering machine capable of transmitting and receiving stitch data concerning an embroidery design between the embroidering machine and an external device through a communication line. The data transmitted and received, however, is limited to stitch data and, as to control data, data concerning desired changing and controlling functions must be set each time the stitch data is changed.

In the embroidering operation, therefore, control data concerning desired changing and controlling functions must be manually set each time the stitch data is changed. This is troublesome and imposes burden on the operator.

Further, in the prior art automatic embroidering machine, it is entirely impossible to conserve or edit once established control data in an external device.

SUMMARY OF THE INVENTION

It is an object of the invention to provide an embroidering machine capable of storing stitch data for each embroidery design and also control data for changing stitch data or controlling the embroidering operation for each embroidery design, reading out stitch data and control data for a desired embroidery design and performing execution and control of the embroidering operation thereby alleviating burden to the operator in setting the control data.

It is another object of the invention to provide an embroidering machine capable of combining stitch data for plural embroidery designs recorded in an external memory device such as a paper tape into a series of stitch data corresponding to a single embroidery design and storing this stitch data in a memory for enabling the embroidering operation to be executed in accordance with the stitch data stored in the memory.

It is still another object of the invention to provide an embroidering machine capable of temporarily stopping a stitching operation at a stitch in an embroidering design in the course of the embroidering operation and executing data editing with respect to a desired stitch associated with the stitch at which the stitching operation has been stopped thereby enabling editing such as change, deletion and insertion of stitch data to be performed while confirming actual embroidery design in the course of the embroidering operation.

It is still another object of the invention to provide an embroidering machine capable of displaying an embroidery design pattern in a display and designating a desired stitch after watching this display thereby enabling editing of stitch data concerning the designated stitch.

It is still another object of the invention to provide an embroidering machine capable of transmitting and receiving not only stitch data concerning an embroidery design but also control data for changing stitch data or controlling the embroidering operation between the embroidering machine and an external device through a communication line thereby alleviating burden to the operator in setting control data and also enabling the external device to be utilized for processing of control data with resulting expansion of processing functions of the embroidering machine.

The embroidering machine achieving the first object of the invention comprises stitch data memory means for storing stitch data for realizing an embroidering operation corresponding to a desired embroidery design, embroidering operation execution means for executing the embroidering operation in accordance with this stitch data, control data setting means for setting respective control data for changing the stitch data or for controlling the embroidering operation associated with the stitch data, control data memory means for storing the control data set by said control data setting means with respect to each embroidery design for which the stitch data is stored in said stitch data memory means, and control means for reading the stitch data and control data for the desired embroidery design from said stitch data memory means and said control data memory means, causing said embroidering operation execution means to execute the embroidering operation corresponding to the read out stitch data and controlling change of the stitch data and the embroidering operation in accordance with the read out control data.

Respective control data for changing stitch data or controlling the embroidering operation associated with the stitch data are set as desired by the setting means.

A set of control data thus set by the setting means is stored in the control data memory means in correspondence to a desired embroidery design in the embroidery designs whose stitch data are stored in the stitch data memory means. Thus, a set of control data is set as desired by the control data setting means with respect to each embroidery design whose stitch data has been stored in the stitch data memory means and each of the set control data is stored in the control data memory means.

When the embroidering operation is performed, stitch data and control data concerning a desired ebroidery design are read from the stitch data memory means and the control data memory means by operation of the control means and an embroidering operation in accordance with read out stitch data is executed by the embroidering operation execution means while changing of the stitch data and controlling of the embroidering operation are performed in accordance with the read out control data.

The embroidering machine achieving the second object of the invention comprises stitch data memory means capable of reading and writing for storing stitch data for realizing an embroidering operation corresponding to a desired embroidery design, control means for continuously combining plural sets of stitch data corresponding to plural embroidery designs sequentially input from an external recording device into stitch data corresponding to a single embroidery design and writing the combined data in said stitch data memory means, and execution means for reading stitch data from said stitch data memory means and executing the embroidering operation in accordance with the read out stitch data.

Stitch data of an embroidery design input from an external memory device is normally stored in the stitch data memory means as stitch data of one embroidery design. By operation of the control means, however, stitch data of plural sets corresponding to plural embroidery designs sequentially input from the external memory device are continuously combined into stitch data for a single embroidery design and this combined stitch data is stored in the stitch data memory means. Upon selection of the embroidering operation for an embroidery design consisting of combination of plural embroidery designs, the execution means sequentially reads out a series of stitch data consisting of this combination for the selected embroidery design from the stitch data memory means and executes the embroidering operation in accordance with the read out stitch data.

The plural embroidery designs stored in the external memory device may be originally separate, different embroidery designs or, alternatively, may be plural embroidery designs divided from an originally single embroidery design by reason of memory capacity of the external memory device.

The embroidering machine achieving the third object of the invention comprises stitch data memory means capable of reading and writing for storing stitch data for realizing an embroidering operation corresponding to a desired embroidery design, execution means for executing the embroidering operation by sequentially reading the stitch data from said stitch data memory means stitch by stitch and moving an embroidery frame in accordance with the read out stitch data, stop means for temporarily stopping the sequential reading of the stitch data from said stitch data memory means at a stitch in the process of embroidering the embroidery design and also temporarily stopping the embroidering operation, data editing means for executing, during stopping of the embroidering operation, change or deletion or insertion of stitch data for a desired stitch stored in said stitch data memory means on the basis of the stitch at which embroidering operation has been temporarily stopped, and start means for resuming the temporarily stopped sequential reading of the stitch data and the embroidering operation.

Stitch data is sequentially read stitch by stitch from the stitch data memory means and the embroidering operation is executed by moving the embroidery frame in accordance with the read out stitch data. If it becomes necessary during the embroidering operation to change the design corresponding to the stitch at which the embroidering operation has been made, the stop means temporarily stops the sequential reading of stitch data from the stitch data memory means at a stitch in the course of embroidering of the embroidery design and also temporarily stops the embroidering operation. During stopping of the embroidering operation, the data editing means executes change or deletion or insertion of stitch data for a desired stitch stored in the stitch data memory means on the basis of the stitch at which the embroidering operation has been temporarily stopped. After completion of the stitch data editing, the start means resumes the temporarily stopped sequential reading of the stitch data and the embroidering operation. In the foregoing manner, according to the invention, editing of data such as change, deletion and insertion can be readily made in the course of the embroidering operation while confirming the actual embroidery design.

The embroidering machine achieving the fourth object of the invention comprises stitch data memory means for storing stitch data for realizing an embroidering operation corresponding to a desired embroidery design, means for executing the embroidering operation in accordance with this stitch data, display means for displaying an embroidery design corresponding to stitch data stored in said stitch data memory means, designation means for designating, on a screen of said display means, a desired stitch position in the displayed embroidery design, and data editing means for changing or setting the stitch data corresponding to the stitch position designated by said designation means.

The display means displays an embroidery design corresponding to stitch data stored in the stitch data memory means. The designation means designated, on a screen of the display means, a desired stitch position in the displayed embroidery design. The designation means consists, for example, of a cursor. The data editing means changes or sets the stitch data in the stitch data memory means corresponding to the stitch position designated by the designation means.

The embroidering machine achieving the fifth object of the invention comprises stitch data memory means for storing stitch data for realizing an embroidering operation corresponding to a desired embroidery design, control data memory means for storing respective control data for changing the stitch data or controlling the embroidering operation associated with the stitch data, embroidering operation execution means for executing the embroidering operation in response to the stitch data read from said stitch data memory means and the control data read from said control data memory means, communication interface means for enabling transmission and receiving of the stitch data and the control data between the embroidering machine and an external device, and control means for writing stitch data and control data received from the external device through said communication interface means in said stitch data memory means and said control data memory means and reading stitch data and control data to be transmitted to the external device through said communication interface means from said stitch data memory means and said control data memory means.

Accordingly, both stitch data and control data can be transmitted and received between the embroidering machine and the external device through the communication interface.

Embodiments of the invention will now be described with reference to the accompanying drawings.

BRIEF DESCRIPTION OF THE DRAWINGS

In the accompanying drawings,

FIG. 8 is a flow chart showing an example of data input subroutine in FIG. 6a;

FIG. 24 is a block diagram of a hardware structure schematically showing a control system of still another embodiment of the invention;

FIG. 26 is a flow chart showing an example of design display routine in FIG. 25a;

FIG. 28 is a diagram showing an example of display of an embroidery design pattern.

DESCRIPTION OF PREFERRED EMBODIMENTS

Figure 1A:
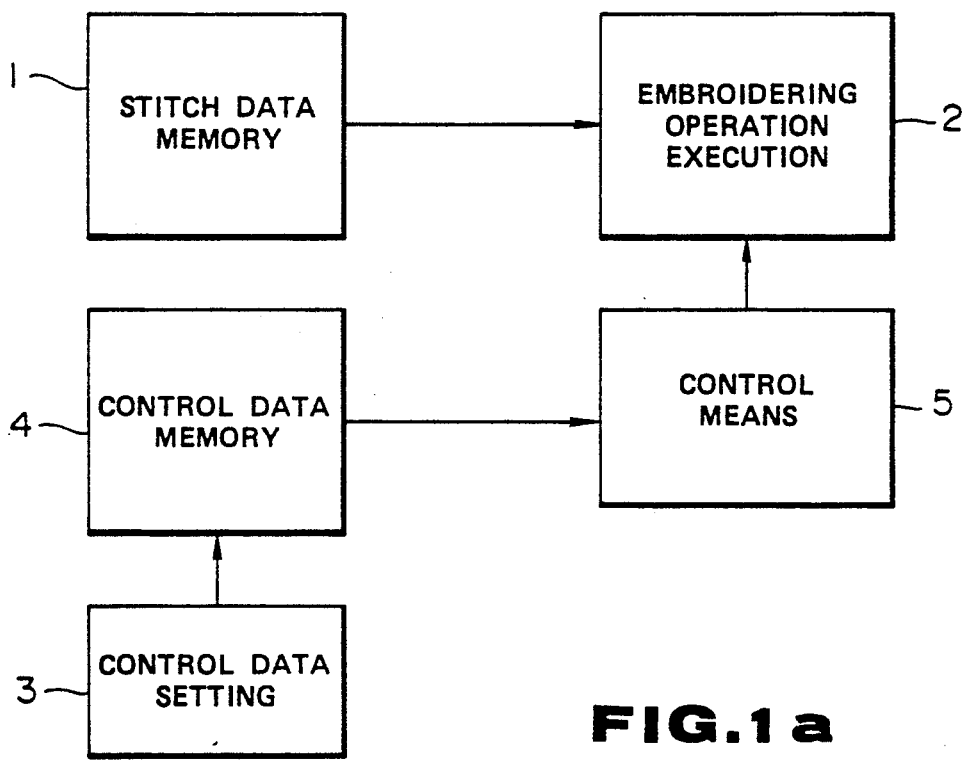
FIGS. 1a through 1e are functional block diagrams respectively showing schematically embodiments of the embroidering machine according to the invention.

In the embodiment of FIG. 1a, stitch data memory means 1 stores stitch data for realizing an embroidering operation corresponding to an embroidery design. Embroidering operation execution means 2 executes the embroidering operation in response to stitch data read from this memory means 1.

Control data setting means 3 sets respective control data for changing the stitch data or controlling an embroidering operation associated with the stitch data in a desired manner. Control data set by this control data setting means 3 corresponding to such changing and controlling functions include:

(1) data designating the order of changing color of thread (referred to as "program control setting data" (abbreviated as "PROCON setting data"))

(2) parameter data designating reducing, enlarging or rotation of X, Y data designating the X, Y moving amount of the embroidery frame in the stitch data for effecting change such as reducing, enlarging and rotation of the embroidery frame (referred to as "data conversion parameter")

(3) data selecting running/rest of each embroidering machine head in a multi-head type embroidering machine (referred to as "head selection data")

(4) data designating the order of stitching of an embroidery design in the case of combining plural embroidery designs and embroidering them continuously (referred to as "design program control setting data (abbreviated as "design PROCON setting data"))

(5) data setting the number of repetition of stitching of the same embroidery design (referred to as "repeat setting data")

(6) data offsetting the offset amount for offsetting the embroidery frame when a needle position at which a boring knife is mounted has been selected (referred to as "offset setting data").

A set of control data set by the setting means 3 is stored in control data memory means 4 in correspondence to a desired embroidery design in the embroidery designs whose stitch data are stored in stitch data memory means 1. Thus, a set of control data is set as desired by the control data setting means 3 with respect to each embroidery design whose stitch data has been stored in the stitch data memory means 1 and each of the set control data is stored in the control data memory means 4.

When the embroidering operation is performed, stitch data and control data concerning a desired embroidery design are read from stitch data memory means 1 and the control data memory means 4 by operation of the control means 5 and an embroidering operation in accordance with read out stitch data is executed by embroidering operation execution means 2 while changing of the stitch data and controlling of the embroidering operation are performed in accordance with the read out control data.

It is therefore unnecessary to change setting of control data each time the embroidery design is changed and, by simply selecting a desired embroidery design, a set of control data which has been preset for this embroidery design is obtained. This alleviates burden on the operator in setting control data.

Figure 1B:
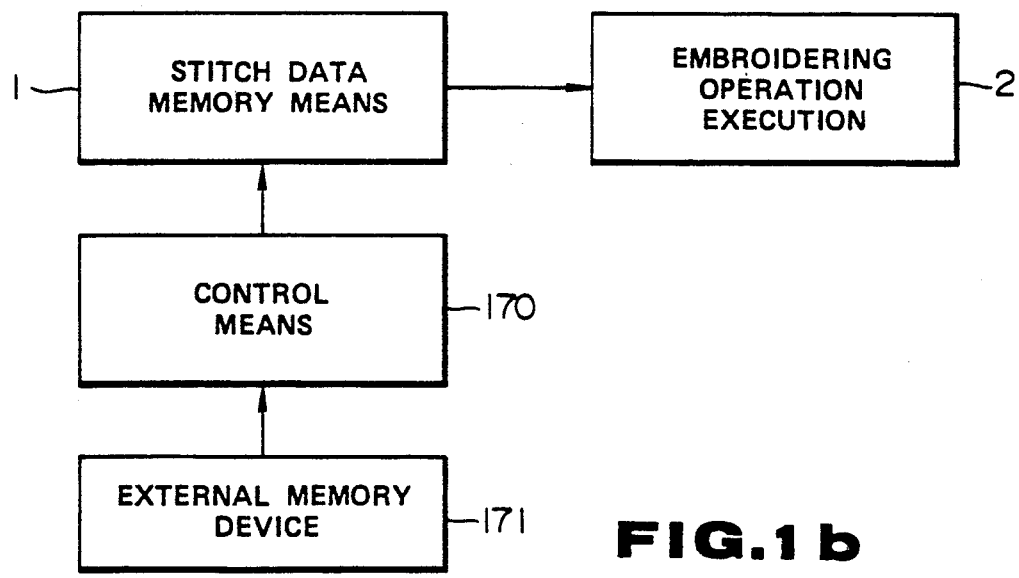

In the embodiment of FIG. 1b, control means 170 continuously combines stitch data of plural sets corresponding to plural embroidery designs sequentially input from an external memory device 171 into stitch data for a single embroidery design and writes this combined stitch data in the stitch data memory means. Upon selection of the embroidering operation for an embroidery design consisting of combination of plural embroidery designs, execution means 2 sequentially reads out a series of stitch data consisting of this combination for the selected embroidery design from stitch data memory means 1 and executes the embroidering operation in accordance with the read out stitch data.

Figure 1C:
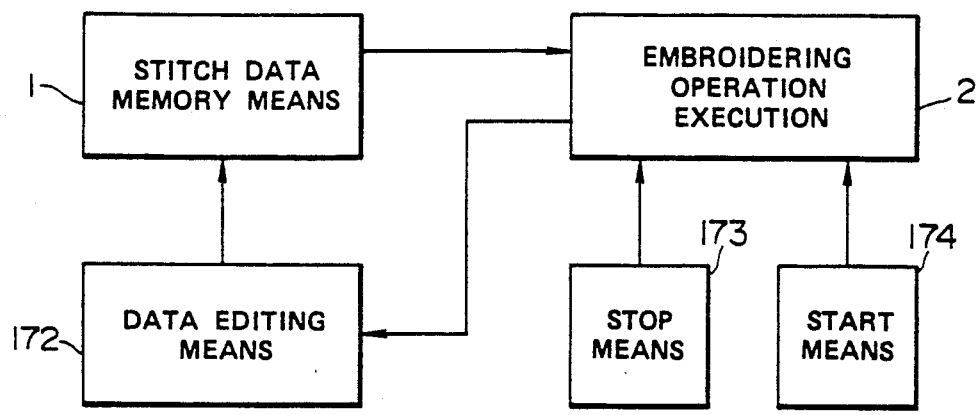

In the embodiment of FIG. 1c, stop means 173 temporarily stops the sequential reading of stitch data from stitch data memory means 1 at a stitch in the course of embroidering of the embroidery design and also temporarily stops the embroidering operation. During stopping of the embroidering operation, data editing means 172 executes change or deletion or insertion of stitch data for a desired stitch stored in the stitch data memory means on the basis of the stitch at which the embroidering operation has been temporarily stopped. After completion of the stitch data editing, start means 174 resumes the temporarily stopped sequential reading of the stitch data and the embroidering operation. According to the invention, therefore, editing of data such as change, deletion and insertion can be readily made in the course of the embroidering operation while confirming the actual embroidery design.

Figure 1D:
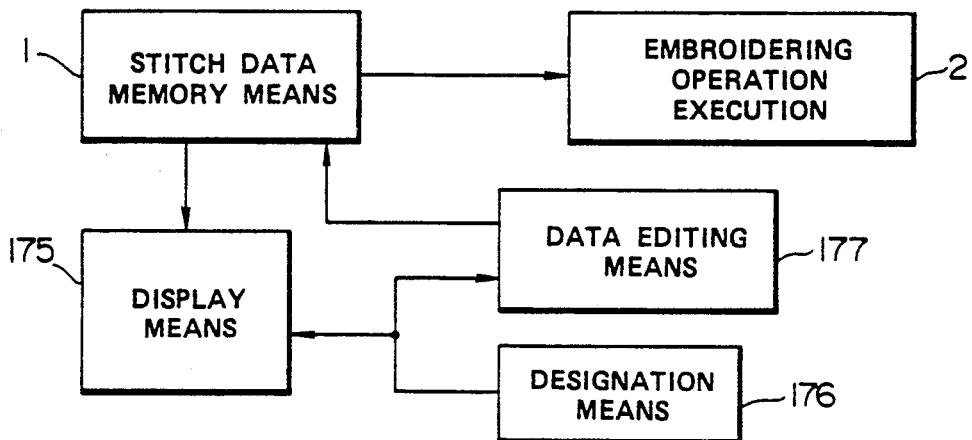

The embodiment of FIG. 1d is one in which a desired embroidery design is displayed by a display and editing of stitch data is executed while confirming this embroidery design in the display.

Display means 175 displays an embroidery design corresponding to stitch data stored in stitch data memory means 1. Designation means 176 designates, on a screen of the display means 175, a desired stitch position in the displayed embroidery design. The designation means 176 consists, for example, of a cursor. Data editing means 177 changes or sets the stitch data in the stitch data memory means 1 corresponding to the stitch position designated by the designation means 176.

Assume, for example, that an embroidery design displayed in the display means 175 is as shown in FIG. 28 and "stop code" for changing color of thread is registered for stitches at points a and b in this embroidery design. In this case, the embroidering operation of this embroidery design is executed with three colors, i.e., in the first thread color from the start point to the point a, the second thread color from the point a to the point b and the third thread color from the point b to the end point. Assume that the operator watches the screen of the display 175 in this state and desires to change color of thread further at points c, d and e in the embroidery design. In this case, the desired positions (in this case, points c, d and e) in the embroidery design displayed on the screen of the display means 175 are designated by the designation means 176 and "stop code" is set as function data by the data editing means 177 in correspondence to stitches of the respective designated points. Thus, the thread color is changed five times so that the embroidery design is embroidered with six colors.

According to this embodiment, therefore, the embroidery design is displayed on a screen of the display means 175, a desired stitch position is designated while confirming the embroidery design on the screen and data editing such as change or modification of stitch data corresponding to this stitch position is executed. Accordingly, data editing such as change or modification of stitch data can be made promptly and simply.

Figure 1E:
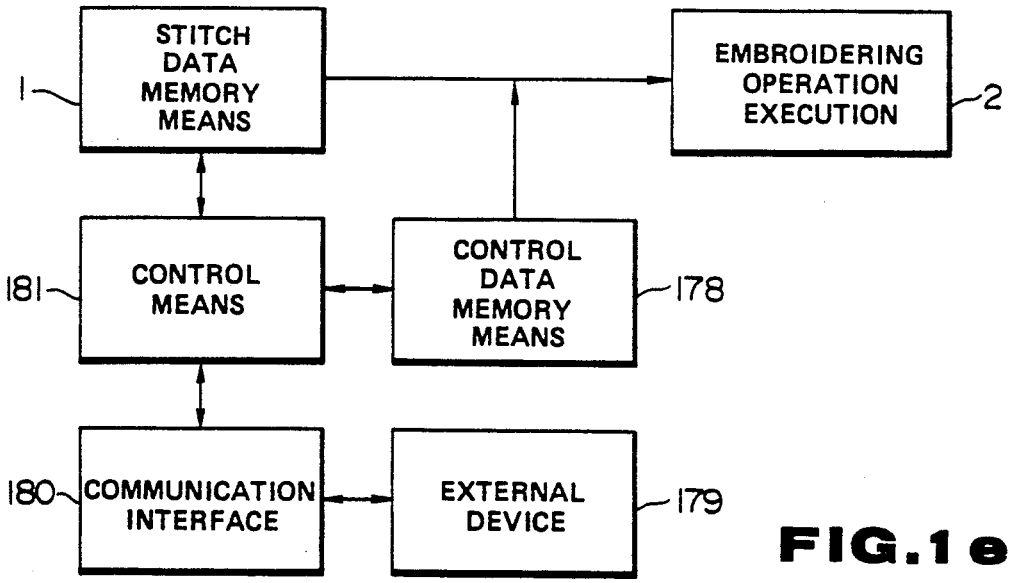

The embodiment of FIG. 1e is one having a communication interface and being capable of transmitting and receiving both stitch data for realizing an embroidering operation and respective control data for controlling the embroidering operation associated with the stitch data between the embroidering machine and an external device such as a computer having a communication function.

Control data memory means 178 stores respective control data for changing stitch data stored in stitch data memory means 1 or controlling the embroidering operation associated with the stitch data. Embroidering operation execution means 2 executes the embroidering operation in response to the stitch data read from the stitch data memory means 1 and the control data read from the control data memory means 178. Communication interface means 180 is provided for enabling transmission and receiving of the stitch data and the control data between the embroidering machine and an external device 179. Control means 181 is provided for writing stitch data and control data received from the external device 179 through the communication interface means 180 in the stitch data memory means 1 and the control data memory means 178 and reading stitch data and control data to be transmitted to the external device 179 through the communication interface means 180 from the stitch data memory means 1 and the control data memory means 178.

Receiving of data from the external device 179 through the communication interface means 180 is performed as follows: The external device 179 transmits stitch data and control data. The embroidering machine receives both data through the communication interface means 180. By operation of the control means 181, the received control data and stitch data are written in the control data memory means 178 and the stitch data memory means 1 and stored therein.

Transmission of control data and stitch data preset as desired in the embroidering machine to the external device 179 through the communication interface means 180 is performed as follows: By operation of the control means 181, desired control data to be transmitted to the external device 179 is read from the control data memory means 178 and transmitted through the communication interface means 180. Desired stitch data to be transmitted to the external device 179 is read from the stitch data memory means 1 and transmitted through the communication interface means 180. The control data includes, as described above, "PROCON setting data" designating the order of changing color of thread and other various data.

Thus, by virtue of this communication function, stitch data and control data corresponding to the stitch data can be transmitted and received between the embroidering machine and the external device 179 through the communication interface means 180 so that burden on the operator concerning setting of the control data is alleviated and the processing function of the embroidering machine is expanded by utilizing the external device in processing the control data.

The embodiments of the invention will be described more fully below.

Figure 2:
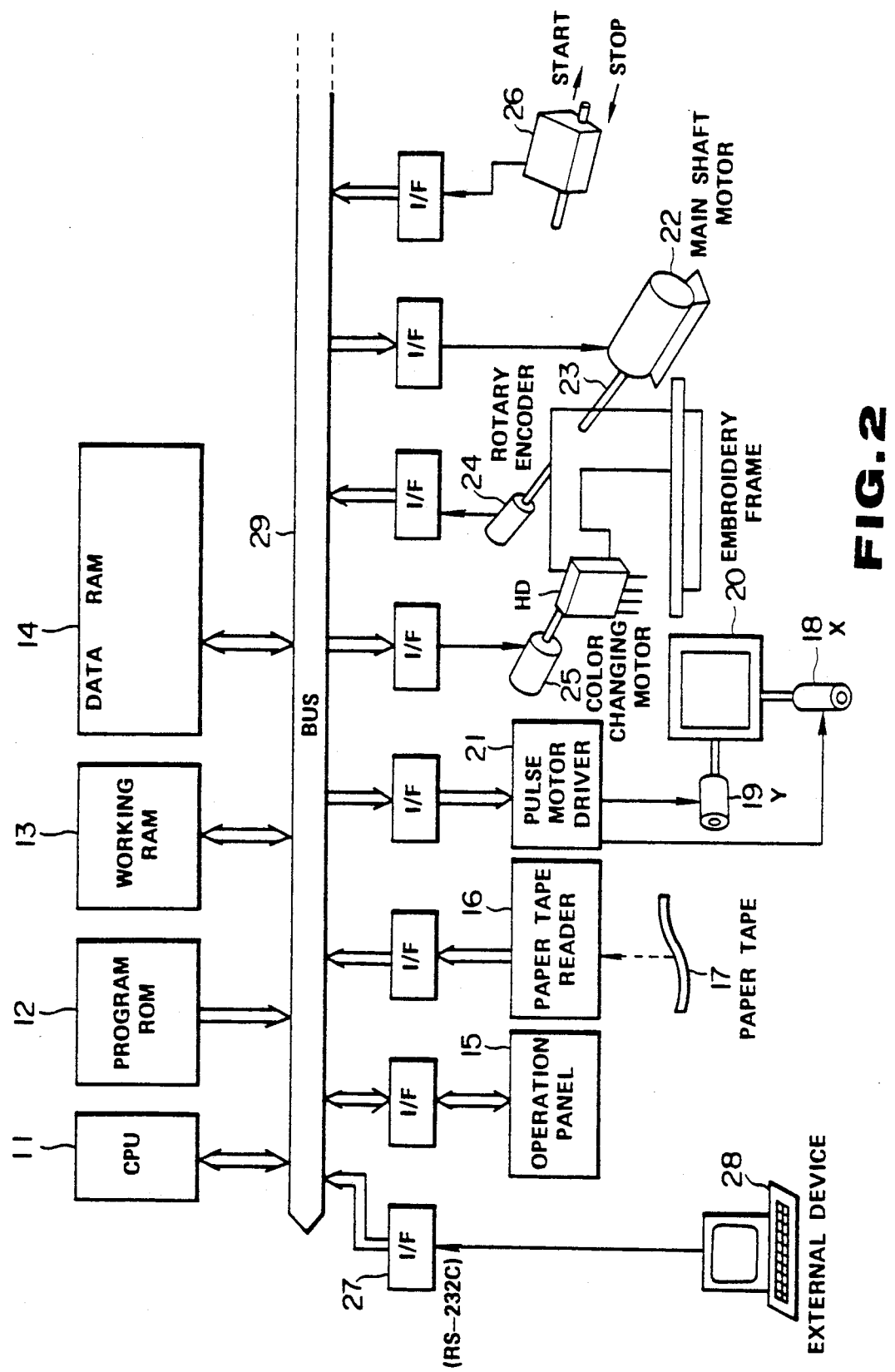
FIG. 2 is a block diagram showing a hardware structure schematically showing a control system of an embodiment of the embroidering machine.

FIG. 2 is a diagram showing a hardware structure of an embodiment of the control system for an automatic embroidering machine according to the invention. The operation of the entire automatic embroidering machine is controlled by a microcomputer including a CPU 11, a program ROM 12 and a working RAM 13. A data RAM 14 stores various data including stitch data for realizing a desired embroidery design, the above described various control data for each embroidery design and other data relating to embroidery stitching.

An operation panel 15 includes various setting switches and displays. A paper tape reader 16 reads out stitch data recorded on a paper tape (data directly relating to the embroidery operation such as X, Y data designating position of an embroidery frame for each stitch and function data designating operations of the embroidering machine including color changing, stopping of the main shaft of the machine and jump). A paper tape 17 on which stitch data for realizing a desired embroidery design is recorded is set in this paper tape reader 16. The stitch data read from this paper tape 17 through the paper tape reader 16 is transmitted to the data RAM 14 and stored therein.

An X-axis pulse motor 18 moves an embroidery frame 20 in the X-axis direction. A Y-axis pulse motor 19 moves the embroidery frame 20 in the Y-axis direction. To these pulse motors 18 and 19 are applied drive signals through a pulse motor driver 21.

A main shaft motor 22 drives a main shaft 23 of this automatic embroidering machine to be rotated. As is well known, a needle and a hook of the embroidering machine are driven in accordance with the rotation of the main shaft 23. A rotary encoder 24 detects the angle of rotation of the main shaft 23 (or motor 22).

Assuming that one stitching head HD is a multi-needle stitching head, this head HD comprises a plurality of needles (each needle being attached with thread of a different color). A color changing motor 25 causes, by its rotation, one of the plural needles of the head HD to be selected and driven by a needle drive mechanism in the head HD. The needle drive mechanism is adapted to move the needle vertically as the main shaft 23 is rotated. Since this needle drive mechanism is known, illustration thereof is omitted. The number of the stitching head HD is not limited to one but plural stitching heads may be provided in parallel.

A start/stop switch 26 consists of a bar switch which functions as a start switch when the bar is manipulated, e.g., in the rightward direction and functions as a stop switch when the bar is manipulated, e.g., in the leftward direction. When this start switch is ON, the rotation of the main switch 23 is started and when the stop switch is ON, the rotation of the main shaft 23 is stopped.

A communication interface 27 is an external input-output interface for effecting inputting and outputting of stitch data and control data between the embroidering machine and an external device 28. The communication interface 27 consists of, e.g., an RS-232 serial interface.

The external device 28 consists of, e.g., a personal computer having a communication function or terminal device of a suitable intelligent type and is capable of setting, editing and storing of stitch data and control data corresponding to the embroidery design. The external device 28 performs inputting and outputting of stitch data and control data with the embroidering machine through a communication line.

The automatic embroidering machine further comprises other devices and equipments whose illustration is omitted. The devices constituting the control system of the automatic embroidering machine deliver out and receive signals with the microcomputer through an interface I/F.

Figure 3:
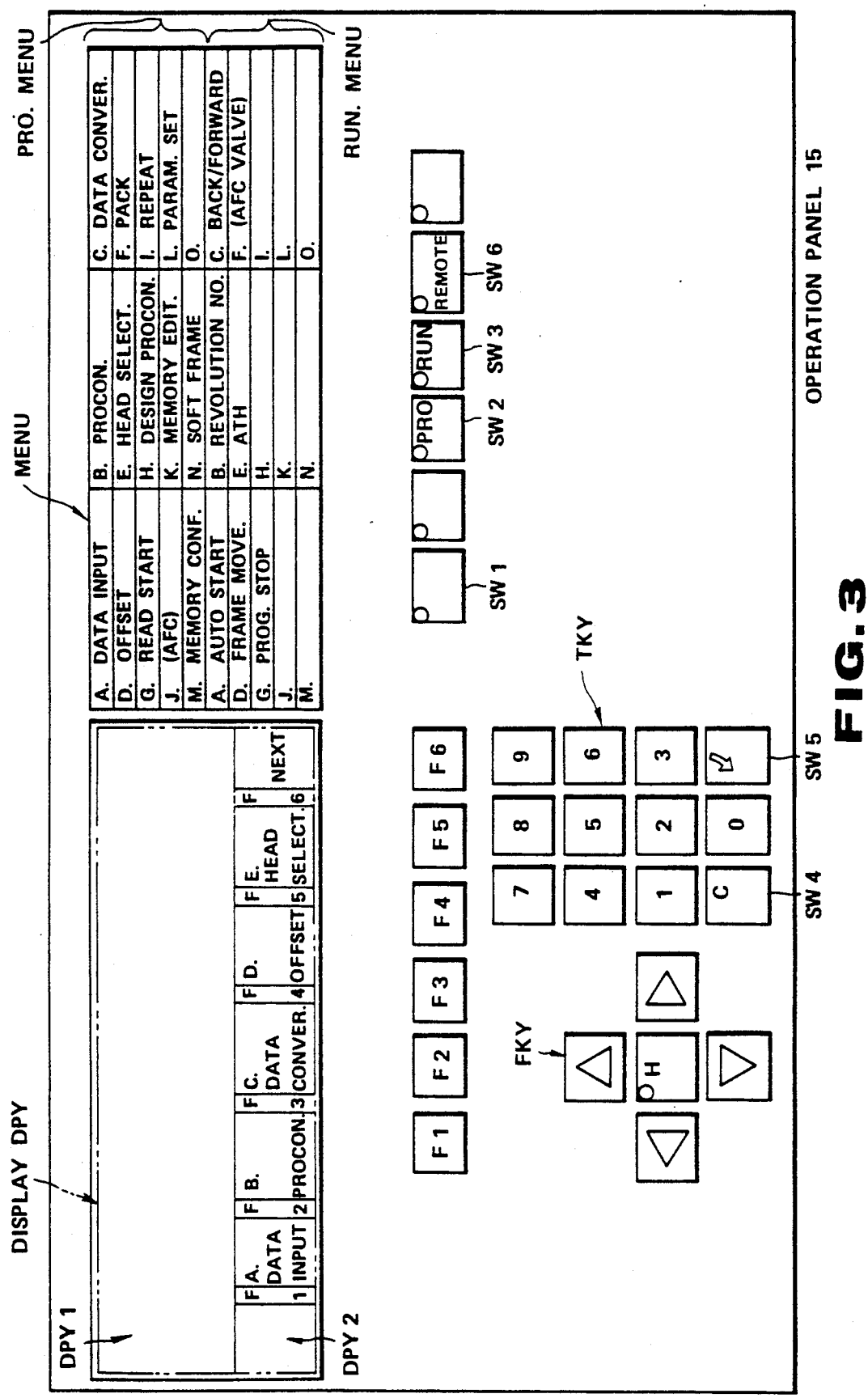
FIG. 3 is a plan view showing an example of an operation panel in FIG. 2.

An example of the switches and displays provided in the operation panel 15 is shown in FIG. 3.

A display DPY is provided for displaying data which is being set during setting of various data, displaying data which has already been set for confirmation thereof and displaying other necessary information. The display DPY is capable of displaying letters and also figures if necessary. The display DPY can be used in several display modes and, as one of such display modes, there is a display mode for setting various data or confirming contents of the set data. In this mode, as shown in FIG. 3, the display DPY functions in two sections of a set contents display section DPY1 occupying a relatively large area in the upper stage of the display DPY and a function switch explanation display section DPY2 in the lower stage. In another display mode, the display DPY functions as display means for displaying a graphic pattern of the embroidery pattern. A quartz display may for example be employed as this display DPY.

Six function switches F1-F6 are provided below the display DPY. The above described function switch explanation display section DPY2 displays explanation about the function assigned to the respective function switches F1-F6.

Depending upon the state of assignment of the functions to the function switches F1-F6, the left side five function switches F1-F5 sometimes function as function switches corresponding to various data setting functions and the remaining switch F6 functions as a next function (NEXT) selection key. The function switch explanation display section DPY2 consists of six frames corresponding to the function switches F1-F6 and in each of the display frames corresponding to the function switches F1-F6 appears a display explaining the function which is currently assigned to the function switch (e.g., this display consists of letters "DATA INPUT" or "PROCON"). In this case, if the function switch F6 is functioning as the next function selection key, a display "NEXT" explaining the next function selection key function appears.

A function switch menu section MENU disposed on the right side of the display DPY is a list in which displays of all functions assignable to the function switches F1-F6 are visibly and fixedly displayed. This function menu section MENU consists of a program mode menu PRO.MENU and running mode menu RUN.MENU. The program mode menu PRO.MENU displays all functions assignable to the function switches F1-F6 during the program mode. The running mode menu RUN.MENU displays all functions assignalbe to the function switches F1-F6 during the running mode.

The program mode is a mode in which setting of various data relating to the embroidery program for realizing a desired embroidery design (e.g., inputting of data corresponding to the desired embroidery design, i.e., "DATA INPUT" or setting of the order of changing thread color, i.e., "PROCON") is performed. The running mode is a mode in which setting of running conditions (e.g., the revolution number of the main shaft of the machine) before start of operation of the embroidering machine.

A display changeover switch SW1 is provided for switching the display mode of the display DPY. This display changeover switch SW1 is used, for example, when, as illustrated, the display mode is switched from the display mode in which the display DPY is used in the two sections of the setting contents display section DPY1 and the function switch explanation display section DPY2 to another display mode.

A program mode switch SW2 is a switch operated when the operation mode of this embroidering machine is set to the above described program mode.

A running mode switch SW3 is a switch operated when the operation mode of this embroidering machine is set to the above described running mode.

A frame moving key switch FKY is a switch operated when the embroidery frame 20 is moved by a manual operation. A ten key switch TKY is a switch operated when various numerical data are to be inputted. A setting confirmation switch SW4 is a switch operated when contents of set data are to be confirmed in various data setting operations. A set switch SW5 is a switch operated when numerical data inputted by the ten key switch TKY is to be registered or upon completion of setting of a function and functioning as a return key.

Figure 4:
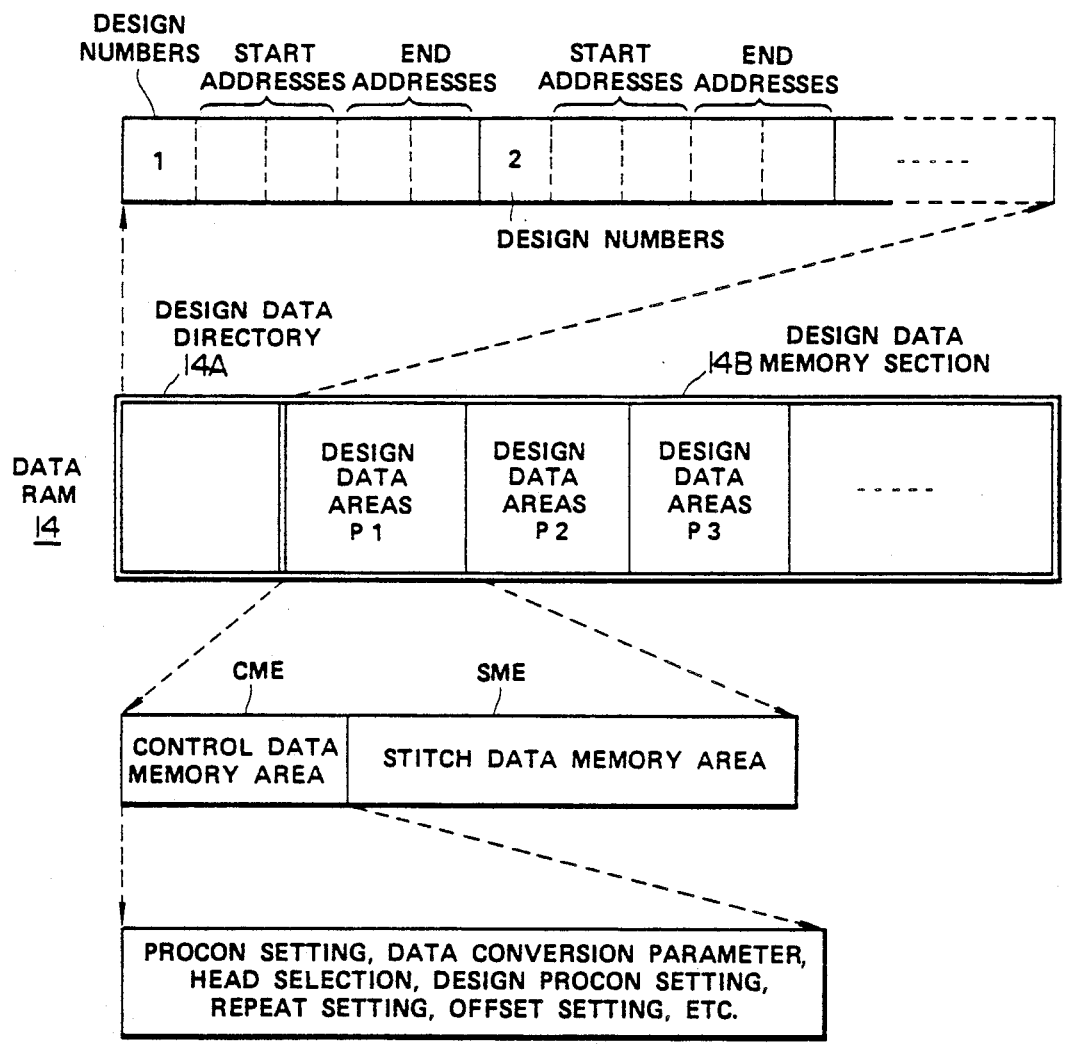
FIG. 4 is a diagram showing an example of memory map of a data RAM in FIG. 2.

FIG. 4 shows an example of a memory map of the data RAM 14. The data RAM 14 generally consists of a design data directory 14A and a design data memory section 14B. The design data memory section 14 can store design data corresponding to plural types of embroidery designs. In the design data memory section 14, design data areas P1, P2 and P3 (assuming that there are three types of registered design data) storing the respective data in correspondence to the registered design data are defined. The area in the design data memory section 14B is left blank. The design data directory 14A stores data designating memory areas of the respective registered design data in the design data memory section 14B (i.e., respective design data areas P1, P2, P3 . . . ).

The design data directory 14A stores, with respect to the respective design data areas P1, P2 and P3 registered in the design data memory section 14B, their design numbers, start addresses (i.e., head addresses of the areas P1, P2, P3 . . . ) and end addresses (last addresses of the areas P1, P2, P3 . . . ). The design numbers are numbers which are set as desired like "1", "2", "3", . . . for the respective areas P1, P2, P3, . . . and used for distinguishing design data which have been registered. When a desired design number has been set by data input during registration, a directory corresponding to this design number is opened in the design data directory 14A. When a desired design number has been designated by data input during reading out, the start address corresponding to this design number is read from the design data directory 14A and one of the design data areas P1, P2, P3 . . . corresponding to this design number is identified thereby and accessed to this area.

The respective data areas P1, P2, P3 . . . consist of a control data memory area CME and a succeeding stitch data memory area SME. The control data memory area CME stores control data according to the invention with respect to the respective design numbers.

The stitch data memory area SME stores stitch data for realizing desired embroidery stitching. The control data memory area CME stores various control data set in correspondence to the specific design number including, in this embodiment for example, "PROCON setting data", "data conversion parameter", "head selection data", "design PROCON setting data", "repeat setting data" and "offset setting data". The stitch data SME stores known stitch data (i.e., data relating to the embroidering operation for each stitch including X, Y data designating the moving amount of the embroidery frame and function data designating operations of the embroidering machine such as color changing, stopping of the embroidering machine main shaft and jump) for each stitch.

Nextly, operations concerning the present invention among the operations executed by the automatic embroidering machine of FIG. 2 under the control of the microcomputer will be described with reference to flow charts of FIG. 5 and subsequent figures.

Figure 5:
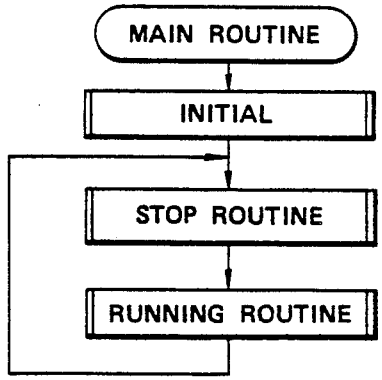
FIG. 5 is a flow chart showing a main routine of a program executed by a microcomputer in FIG. 2.

Upon turning on of the automatic embroidering machine, as shown in FIG. 5, the processing proceeds to embroidering machine main shaft stop routine through a predetermined initial routine. Processing operations for setting various data are executed in this main shaft stop routine. When the machine is not run, this main shaft stop routine is always carried out. When the start switch has been turned ON by operating the start/stop switch 26, the processing proceeds to running routine. In the running routine, the main shaft 23 is driven and rotated and stitch data for each one stitch is sequentially read out from the stitch data memory area SME in the data RAM 14 in synchronism with one rotation of the main shaft and the stitching operation is carried out in accordance with the read out data.

An example of the main shaft stop routine will be described with reference to FIGS. 6a, 6b. In stop initial routine, a predetermined initializing processing during stop of the machine is executed. In next step 30, whether or not the operation mode is the running mode or the program mode is examined in accordance with the contents of an operation mode flag. The operation mode becomes the program mode by turning on of the program mode switch SW2 and the running mode by turning on of the running mode switch SW3.

If the operation mode is the program mode, the processing proceeds to step 31 and subsequent steps for setting various data in the program mode. Selection of a mode for setting data in the program mode is made by operating the function switches F1–F6 in the following manner.

In the program mode, the display DPY first becomes a state as shown in FIG. 3 and the function switch explanation display section DPY2 displays explanation of the modes A–E in the program mode. If a next function is selected by depressing the function switch F6, display on the function switch explanation display DPY2 is changed to explanation of the modes F–J in the program mode.

When a next function has been selected by depression of the function switch F6, the screen of the function switch explanation display section DPY2 is changed to display of explanation of the modes K–M in the program mode. Thus, by bringing the screen of the function switch explanation display DPY2 into a state in which explanation of a desired data setting mode (e.g., items A–M) in the program mode is displayed and thereupon operating one of the function switches F1–F5 corresponding to explanation display of the desired data setting mode (e.g., items A–M) displayed in the screen, the desired data setting mode (e.g., one of the items A–M). In the flow chart of FIG. 6, for brevity of description, illustration of processing steps for making predetermined displays on the screen of the display DPY and detecting the operation of the function switch F6 and changing its display is omitted.

Figure 8:
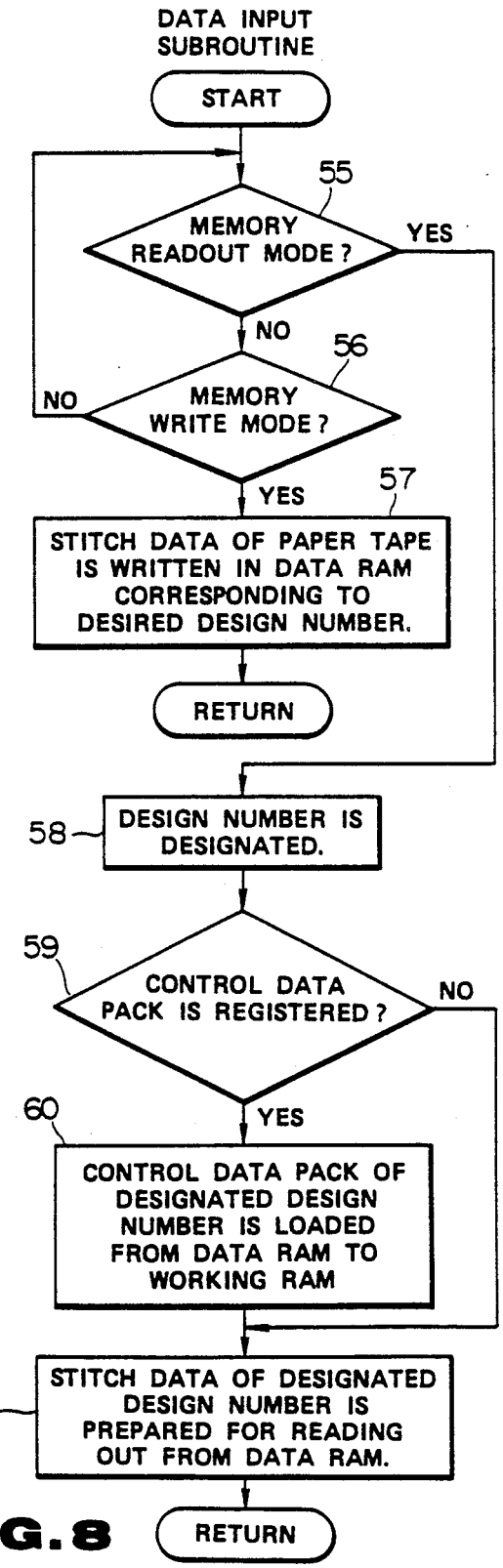

In step 31, "data input setting switch ON" or not is examined. In this step, whether or not, for selecting the mode of the item A, i.e., "data input setting mode", the function switch F1 coresponding to the item A has been turned on in a state in which explanation of the items A–E is displayed in the function switch explanation display section DPY2 is examined. If result is YES, "data input subroutine" in step 32 is executed. An example of this "data input subroutine" in step 32 is shown in FIG. 8. If step 31 is NO, the processing proceeds to step 33 in which another data setting mode is examined. The "data input setting mode" means a mode for setting either picking up stitch data corresponding to a desired embroidery design from the tape or reading the stitch data from the data RAM 14 and processings for this purpose are executed in "data input subroutine".

In steps 33–38, whether or not a switch operation for selecting modes setting various control data for changing stitch data or controlling the stitching operation (the above described "PROCON setting data", "data changing parameter", "head selection data", "offset setting data" etc.) is examined.

In step 33, "PROCON setting switch ON" or not is examined. In this step, whether or not, for selecting the mode of item B, i.e., "PROCON setting mode", the function switch F2 corresponding to the item B has been turned on in a state in which explanation of the items A–E is displayed in the function switch explanation display section DPY2 is examined. If result is YES, "PROCON setting subroutine" in step 39 is executed. In this "PROCON setting subroutine", data setting in "PROCON setting mode" is executed.

The "PROCON setting mode" is a mode in which data for designating the order of changing color of thread is set. In other words, in this "PROCON setting subroutine", data for indicating needle numbers to be selected at respective orders in changing color of thread are respectively set. Selected needle number data set in correspondence to the respective orders of changing color of thread are called PROCON setting data. Desired needle number data is input by the ten key switch TKY. The set PROCON setting data is temporarily stored in the control data memory area in the working RAM 13.

In step 34, "data conversion parameter setting switch ON" or not is examined. In this step, whether or not, for selecting the mode of the item C, i.e., "data conversion parameter setting mode", the function switch F3 corresponding to the item C has been turned on in a state in which explanation of the items A–E is displayed in the function switch explanation display section DPY2 is examined. If result is YES, "data conversion parameter setting subroutine" in step 40 is executed. In this "data conversion parameter setting subroutine", data setting in "data conversion parameter setting mode" is executed. The "data conversion parameter setting mode" is a mode for setting data conversion parameter for reducing or enlarging or rotating X, Y data designating the X, Y moving amount of the embroidery frame in the stitch data. As the data conversion parameters, there are multiplication ratio data A for reducing or enlarging the embroidery design, rotation angle data $\theta$ for rotating the embroidery design and mirror inversion data M for setting whether or not the embroidery design should be mirror inverted. The mirror inversion data M is "1" when the embroidery design should be mirror inverted and "0" when it should not be mirror inverted. Desired values of the respective data conversion parameters are input by the ten key switch TKY. The input data conversion parameters A, $\theta$ and M are temporarily stored in the control data memory area in the working RAM 13.

In step 35, "offset setting switch ON" or not is examined. In this step, whether or not, for selecting the mode of the item D, i.e., "offset setting mode", the function switch F4 corresponding to the item D has been turned on in a state in which explanation of the items A–E is displayed in the function switch explanation display section DPY2 is examined. If result is YES, "offset setting subroutine" in step 41 is executed. In this "offset setting subroutine", data setting in the "offset setting mode" is executed. The "offset setting mode" is a mode for setting offset setting data setting the above described offset amount of the embroidery frame. A desired offset amount is set by the ten key switch TKY. The set offset setting data is temporarily stored in the control data memory area in the working RAM 13.

In step 36, "head selection setting switch ON" or not is examined. In this step, whether or not, for selecting the mode of the item E, i.e., "head selection setting mode", the function switch F5 corresponding to the item E has been turned on in a state in which explanation of the items A–E is displayed in the function switch explanation display section DPY2 is examined. If result is YES, "head selection setting subroutine" in step 42 is executed. In this "head selection setting subroutine", data setting in "head selection setting mode" is executed. The "head selection setting mode" is a mode in which head selection setting data for setting running/rest combination for each embroidering machine head is set at each step of changing color of thread in a multihead type embroidering machine. Desired combinations of running/rest of the respective embroidering machine heads corresponding to the order of changing of color of thread are set by the ten key switch TKY. The set head selection setting data is temporarily stored in the control data memory area in the working RAM 13.

In step 37, "design PROCON setting switch ON" or not is examined. In this step, whether or not, for selecting the mode of the item H, i.e., "design PROCON setting mode", the function switch F3 has been turned on in a state in which explanation of the items F–J is displayed in the function switch explanation display section DPY2 is examined. If result is YES, "design PROCON setting subroutine" in step 43 is executed. In this "design PROCON setting subroutine", data setting in "design PROCON setting mode" is executed. The "design PROCON setting mode" is a mode in which the above described design program control setting data is set. More specifically, in this "design PROCON setting subroutine", the design number of a desired embroidery design is set by the ten key switch TKY in correspondence to the order of stitching in the case of successively stitching a combination of plural embroidery designs. The set design PROCON setting data is temporarily stored in the control data memory area in the working RAM 13.

In step 38, "repeat setting switch ON" or not is examined. In this step, whether or not, for selecting the mode of the item I, i.e., "repeat setting mode", the function switch F4 corresponding to the item I has been turned on in a state in which explanation of the items F–J is displayed in the function switch explanation display section DPY2 is examined. If result is YES, "repeat setting subroutine" in step 44 is executed. In this "repeat setting subroutine", data setting in "repeat setting mode" is executed. In this "repeat setting subroutine", data for setting the number of repetition of stitching of the same embroidery design is set by the ten key switch TKY. The set repeat setting data is temporarily stored in the control data memory area in the working RAM 13.

In next step 45, other data setting processings in the program mode are executed.

In next step 46, "pack setting switch ON" or not is examined. In this step, whether or not, for selecting the mode of the item F, i.e., "pack setting mode", the function switch F1 corresponding to the item F has been turned on in a state in which explanation of the items F–J is displayed in the function switch explanation display section DPY2 is examined. If result is YES, "pack setting subroutine" of step 47 is executed. An example of this "pack setting subroutine" is shown in FIG. 7.

In "pack setting subroutine", a set of plural kinds of control data (hereinafter referred to as "control data pack") which have been set and temporarily stored in the control data memory area in the working RAM 13 as described above is registered (stored) in package in the control data memory area CME in the data RAM 14 corresponding to the desired design number.

Figure 7:
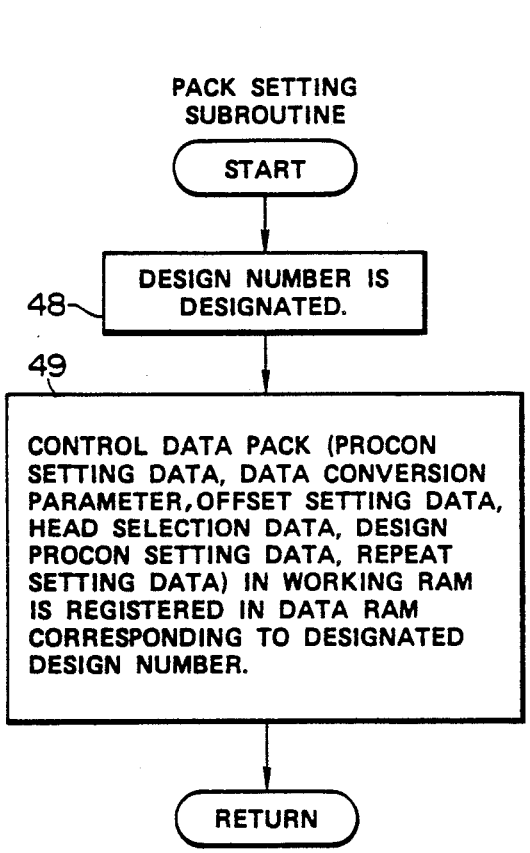
FIG. 7 is a flow chart showing an example of pack setting subroutine.

In FIG. 7, in step 48 first, a design number to be registered of the control data pack which has been set as described above is designated by the ten key switch TKY. In next step 49, the control data pack is read from the control data memory area in the working RAM 13 and written into the control data memory area CME in the data RAM 14 corresponding to the designated design number. Thereafter, the processing returns to the main routine.

Figure 6A:
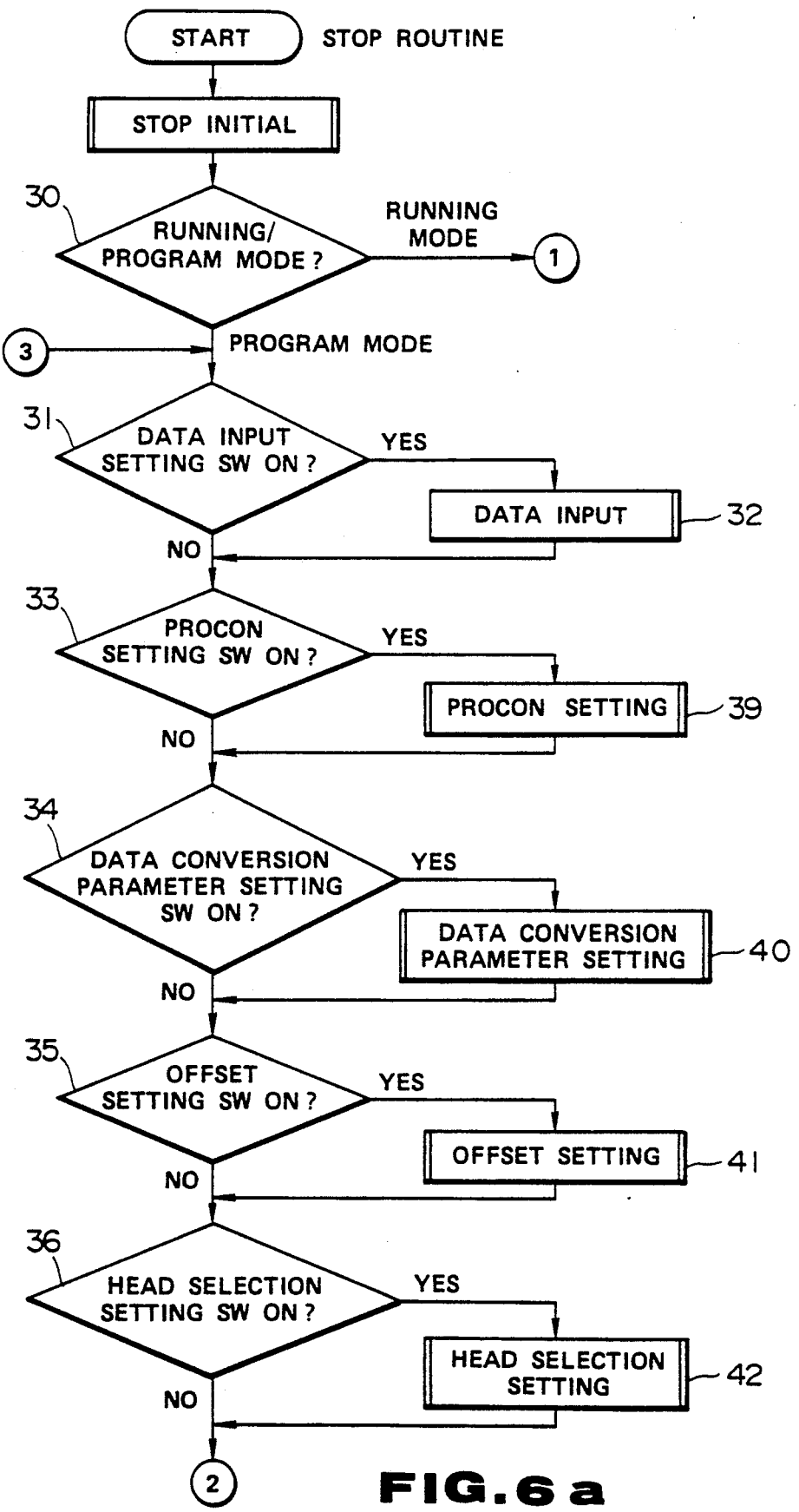
FIGS. 6a and 6b are flow charts showing an example of embroidering machine main shaft stop routine in the main routine of FIG. 5.
Figure 6B:
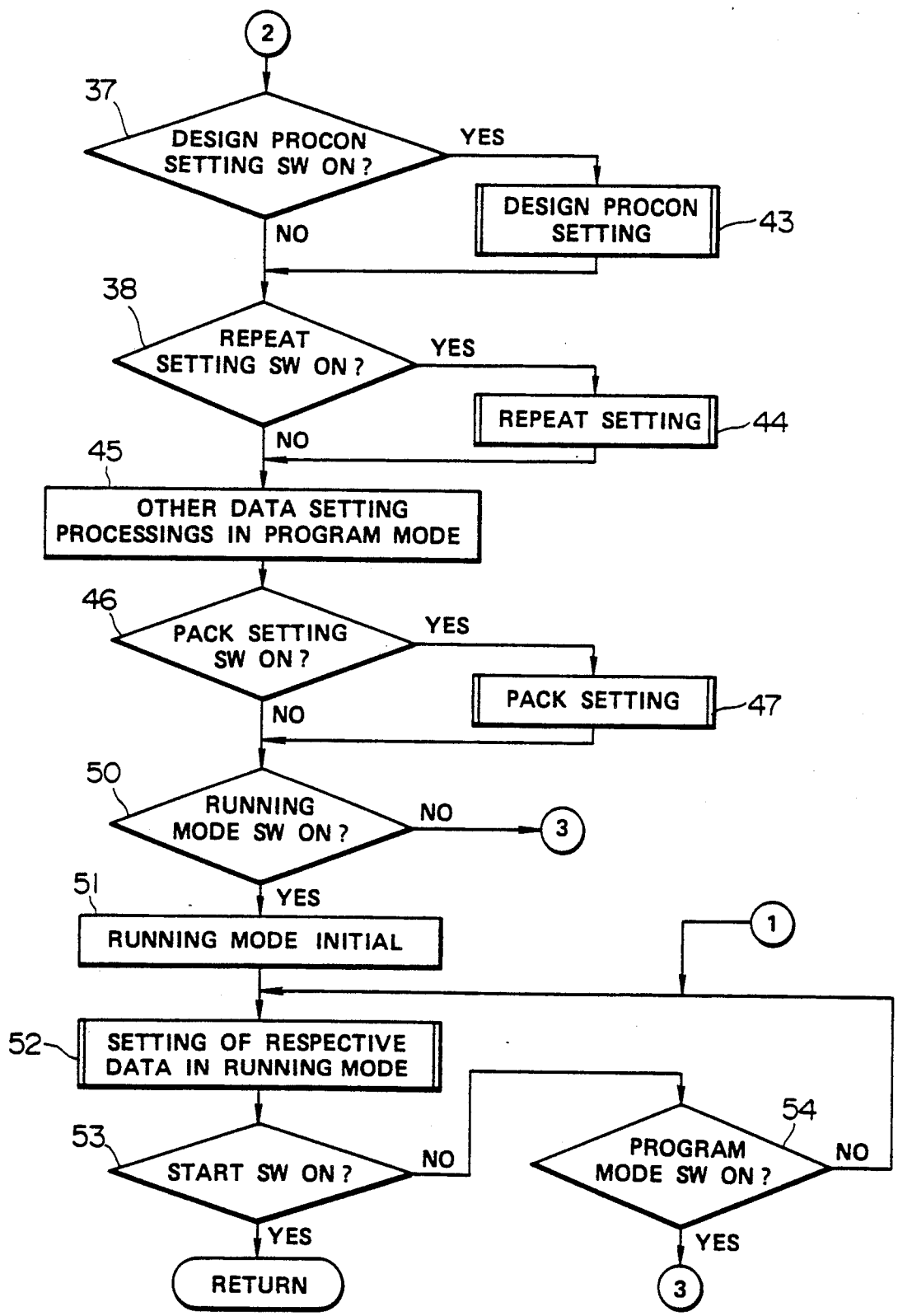

Reverting to FIG. 6b, in step 50, whether or not the running mode switch SW3 has been turned on is examined. If result is NO, the processing returns to step 31 in which the processings in the program mode are repeated.

Upon turning on of the running mode switch SW3, the operation mode is changed from the program mode to the running mode. During a period of time immediately after changing of the operation mode to the running mode, initializing processing of various data for starting the embroidering operation is executed (step 51).

In step 52, setting of respective data in the running mode is executed. In the running mode, the function switch explanation display section DPY2 in the display DPY first displays explanation of the modes A–E (see running mode menu RUN.MENU in FIG. 3). Upon selection of a next function by depression of the function switch F6, the function switch explanation display section DPY2 displays explanation of the modes F and G in the running mode. In a state in which the function switch explanation section DPY2 displays a desired mode, the desired mode is selected by operation of one of the function switches F1–F5. Desired data is set by operation of the ten key switch TKY or the like. If, for example, the revolution number of the embroidering machine is to be set, "revolution number mode" of the item B is selected and a desired revolution number is set by the ten key switch TKY. Thus, necessary embroidering machine running conditions are set in step 52.

In step 53, whether or not the start switch has been turned on by operating the start/stop switch 26 is examined. If the start switch is ON, the processing returns to the main routine and enters the running routine (FIG. 5). If the start switch is not ON, the processing proceeds to step 54 in which whether or not the program mode switch SW2 has been turned on is examined. If result is NO, the processing returns to step 52 in which the routine for setting and processing the respective data in the running mode is repeated. When the program mode switch SW2 has been turned on, the operation mode is changed from the running mode to the program mode and the processing proceeds to step 31 in which the routine for setting and processing the respective data in the program mode is repeated.

Referring now to FIG. 8, "data input subroutine" will be described. In this "data input subroutine", contents of the function switch explanation display section DPY2 are changed to the sub-display in "data input setting mode", i.e., a display representing "memory readout mode" is made in correspondence to the function switch F1 and a display representing "memory write mode" is made in correspondence to the function switch F2. The "memory readout mode" is a mode in which reading out of stitch data corresponding to a desired embroidery design from the data RAM 14 is designated and the "memory write mode" is a mode in which picking up of stitch data corresponding to a desired embroidery design from the paper tape 17 and writing it in the data RAM 14 is designated.

In step 55, whether or not the function switch F1 has been turned on, i.e., whether or not the "memory readout mode" has been selected, is examined. If result is NO, the processing proceeds to step 56 in which whether or not the function switch F2 has been turned on, i.e., whether or not the "memory write mode" has been selected, is examined. If result is NO, the processing proceeds to step 55 whereas if result is YES, the processing proceeds to step 57 in which stitch data corresponding to the desired embroidery design is picked up from the paper tape 17 and stored in the data RAM 14. At this time, the desired design number is designated by operation of the ten key switch TKY and, in accordance with this designated design number, a design data area is established in a design data memory section 14B in the data RAM 14 and the stitch data picked up from the paper tape 17 is stored in the data memory area SME in the design data area corresponding to the designated design number.

If, on the other hand, the "memory readout mode" has been selected, the processing proceeds to step 58 in which the design number of the embroidery design to be read out is designated by operation of the ten key switch TKY.

In next step 59, whether or not control data pack is registered in the control data memory area CME in the data RAM 14 corresponding to the designated design number is examined. If result is YES, the processing proceeds to step 60 in which the control data pack is read from the control data memory area CME corresponding to the designated design number and stored in a predetermined memory position in the working RAM 13. During running of the embroidering machine, control data pack stored in the predetermined memory position in the working RAM 13 (i.e., a set of PROCON data, data conversion parameter, head selection data, design PROCON setting data, repeat setting data, offset setting data etc.) is read out and utilized for changing stitch data or controlling the stitching operation.

In next step 61, reading address of the data RAM 14 is set at the head address in the stitch data memory area SME corresponding to the designated design number (i.e., address of the first stitch) for preparing for reading out of stitch data from the stitch data memory area SME. Then, the processing returns to the main routine (FIG. 5).

An example of the embroidering machine main shaft running routine in the main routine of FIG. 5 will now be described with reference to FIG. 9.

In the running routine, a predetermined initializing processing is executed and then the main shaft motor 22 is started.

In next step 62, various running processings for the embroidering operation are executed.

In next step 63, whether or not contents of the function data relating to the stitch which is currently processed are the color change code is examined. In step 64, whether or not contents of the function data relating to the stitch which is currently processed are the finish code representing finish of the embroidery design is examined. In step 65, whether or not stopping of the embroidering machine main shaft has been completed is examined. If the main shaft has not stopped yet, the processing returns to step 62 in which the running routine is repeated.

Figure 10:
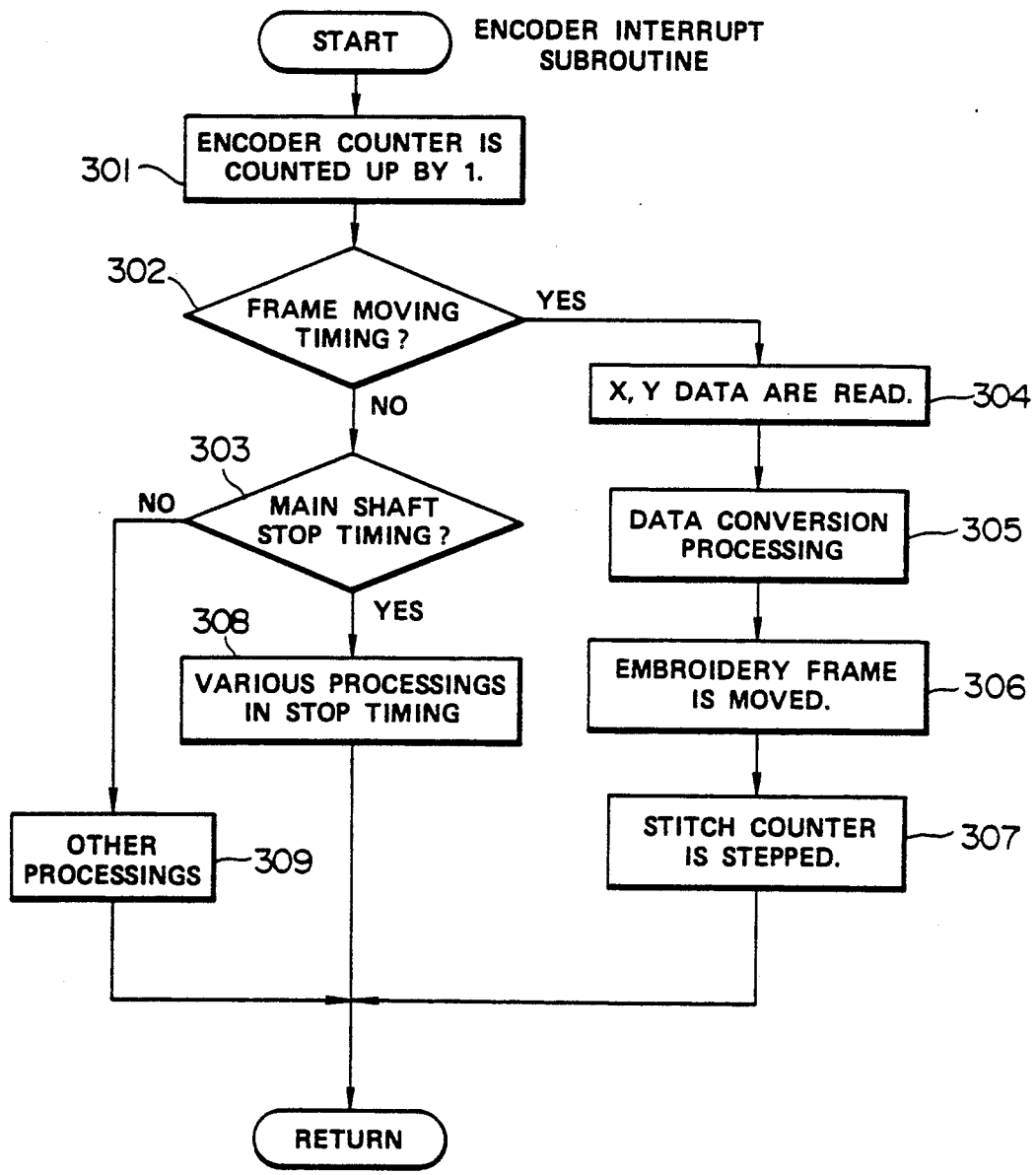
FIG. 10 is a flow chart showing an example of encoder clock interrupt subroutine executed with the routine of FIG. 9.

Upon producing of a clock signal corresponding to the main shaft rotation angle by a rotary encoder 24 of the embroidering machine main shaft 23 during the processing of this running routine, the processing is interrupted and encoder clock interrupt subroutine as shown in FIG. 10 is executed.

In the encoder clock interrupt subroutine, the encoder counter is counted up by 1 (step 301) and which processing timing its count corresponds to is sequentially judged (302, 303) and processings for the respective timings are executed. In the embroidery frame moving timing, X, Y data corresponding to the current embroidery stitch and the function data are read from the data RAM 14 in response to the output of the stitch counter (step 304).

In next step 305, data conversion processing is executed. In this step, data conversion parameters in the control data pack stored in the working RAM 13 are read out and a processing for converting X, Y data in accordance with these data conversion parameters is executed. More specifically, in accordance with the above described multiplication ratio data A, rotation angle $\theta$ and mirror inversion data M (this is either "1" or "0" as described above) as the data conversion parameters, original X, Y data are converted in accordance with the following formulas to obtain converted data Xa, Ya.

$$Xa = A(M \cdot X \cos \theta - Y \sin \theta)$$

$$Ya = A(Y \cos \theta + M \cdot X \sin \theta)$$

In accordance with thus converted embroidery frame X, Y data Xa, Ya, the embroidery frame 20 is X-Y moved (step 306) and then the stitch counter is stepped to next stitch (step 307). Then the processing returns to the running routine.

In step 308, various processings in the stop timing are executed and, in step 309, other processings such as jump are executed.

Figure 9:
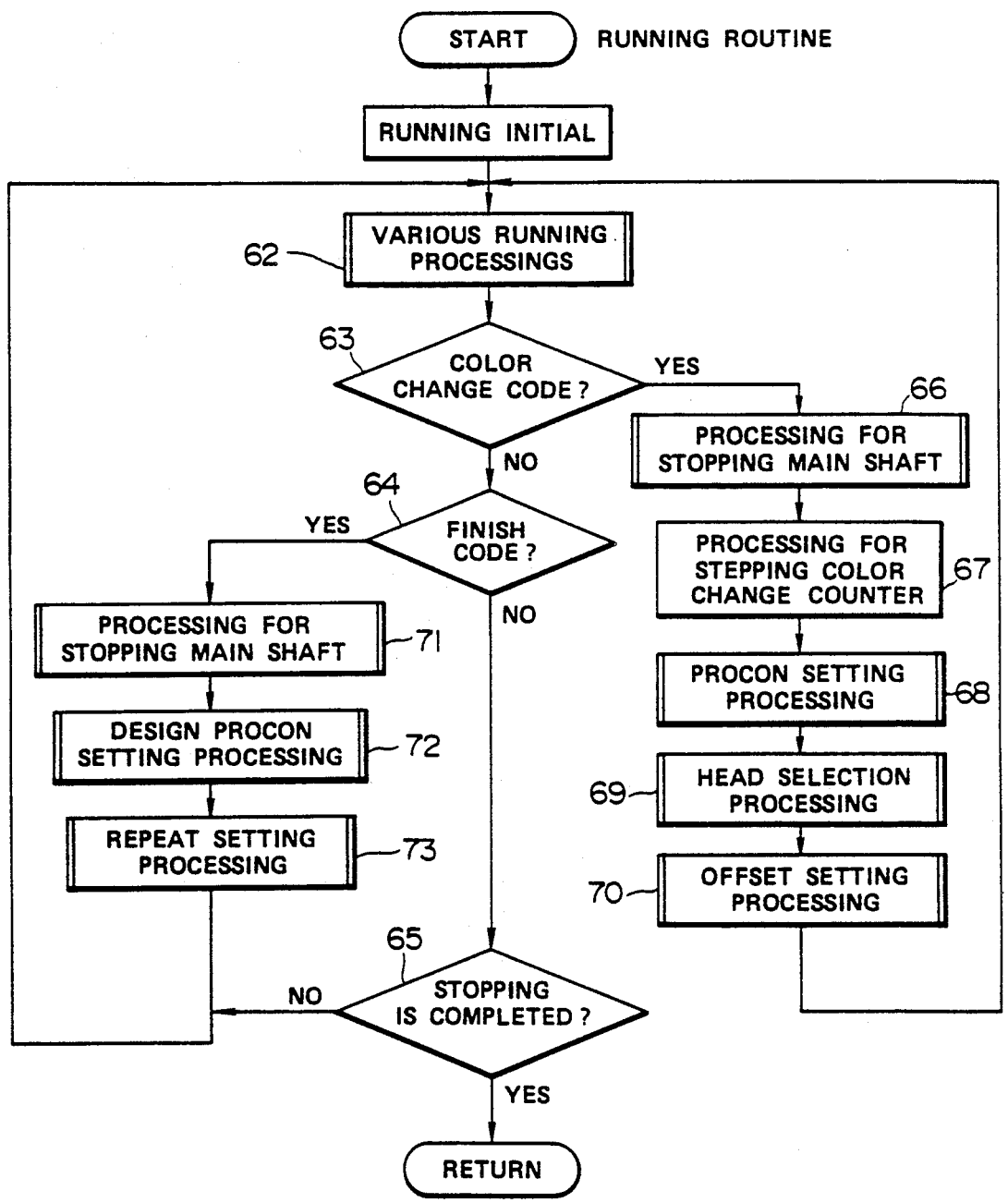
FIG. 9 is a flow chart showing an example of embroidering machine main shaft running routine in the main routine of FIG. 5.

Reverting to explanation of the running routine of FIG. 9, if, in step 63, it has been confirmed that contents of the function data are the color change code, processings of steps 66, 67, 68, 69 and 70 are executed.

In step 66, a processing for stopping the embroidering machine main shaft is executed.

In step 67, a processing for stepping count of a color change counter is executed.

Step 68 is "PROCON setting processing routine" in which the PROCON setting data in the control data pack stored in the working RAM 13 is read out and the color change processing corresponding to this PRO- CON setting data is executed. More specifically, data designating the needle position set in correspondence to the order of changing the color designated by the count of the color change counter and a color change motor 25 is controlled to select this needle position.

Step 69 is "head selection processing routine" in which the head selection data in the control data pack stored in the working RAM 13 is read out and a processing for controlling running/rest with respect to each embroidering machine head in accordance with this head selection data is executed.

Step 70 is "offset setting processing routine" in which the offset setting data in the control data pack stored in the working RAM 13 is read out and a processing for offsetting the embroidery frame in accordance with this offset setting data is executed.

On the other hand, when it has been confirmed that the contents of the function data are the finish code, processings of steps 71, 72 and 73 are executed in step 64.

In step 71, a processing for stopping the embroidering machine main shaft 23 is executed.

Step 72 is "design PROCON setting processing routine" in which the design PROCON setting data in the control data pack stored in the working RAM 13 is read out and a processing for starting stitching operation for an embroidery design to be combined nextly to the embroidery design of which stitching has just been completed is executed in accordance with this design PROCON setting data.

Step 73 is "repeat setting processing routine" in which the repeat setting data in the control data pack stored in the working RAM 13 is read out and a processing for repeating stitching of the same embroidery design after the embroidery design of which stitching has just been completed is executed.

In sum, in setting control data, a set of control data of desired contents are set and registered by processings of the stop routine (FIGS. 6 through 8) for each embroidery design (i.e., each design number) for which stitch data has been registered. During running of the embroidering machine, a set of control data pack corresponding to a desired embroidery design to be embroidered are read out by processings of steps 58-61 of FIG. 8 before starting running and control of the stitching operation and changing of stitch data are executed in accordance with contents of the control data pack by processing of the running routine (FIGS. 9 and 10).

In the above described embodiment, data setting and other processings are executed by the software processing by the microcomputer. These processings may however be implemented by a hardware circuit provided exclusively for this purpose.

The control data pack set and stored in the data RAM 14 in correspondence to the respective embroidery designs may be stored with corresponding stitch data in the paper tape or other external memory.

Nextly, description will be made about an embodiment capable of providing stitch data of one continuous new design by combining stitch data of plural designs stored in a memory.

The hardware structure diagram of this embodiment may be substantially the same as that of FIG. 2. In this embodiment, "data input subroutine" in the stop routine may preferably be constructed as shown in FIG. 11.

Figure 11:
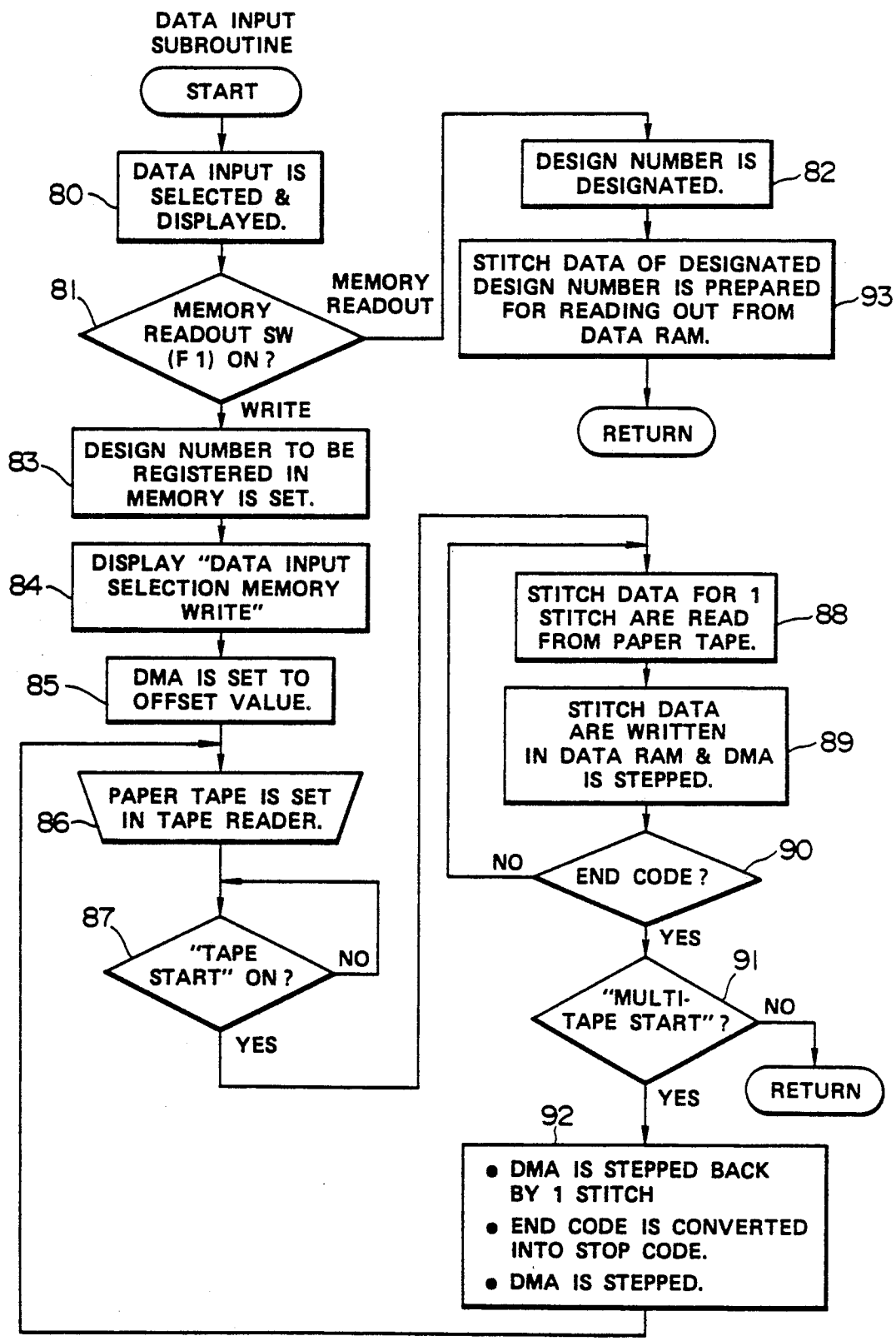
FIG. 11 is a flow chart showing a modified example of the data input subroutine in another embodiment of the invention.
Figure 12A:
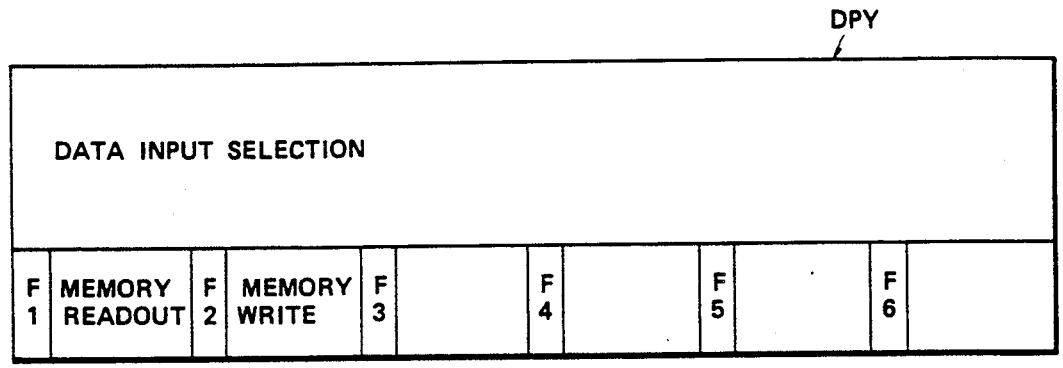
FIGS. 12a and 12b are diagrams showing examples of display by a display unit during execution of processing of FIG. 11.

When the data input mode has been selected, display in the display DPY is changed to "data input" mode display state as shown in FIG. 12a by a processing of step 80 of FIG. 11 and the processing proceeds to next step 81.

In step 81, whether or not the function switch F1 or F2 has been turned on is examined. In this display state, the function corresponding to the function switch F1 is setting of "memory readout" mode so that when stitch data for a desired embroidery design registered in the data RAM 14 of the embroidering machine is to be read out, this switch F1 is turned on to select the "memory readout" mode. The function corresponding to the function switch F2 is setting of "memory write" mode so that when stitch data for a desired embroidery design is to be written in the data RAM 14 from an external recording device, this switch F2 is turned on to select the "memory write" mode. If the function switch F1 is ON, the processing proceeds to step 82 whereas if the function switch F2 is ON, the processing proceeds to step 83.

In step 83, the number of an embroidery design to be registered is set by operation of the ten key switch TKY. The set design number thereby is registered in the data RAM 14. When stitch data for a desired design number is to be read out, this stitch data is designated by setting the design number.

Figure 12B:
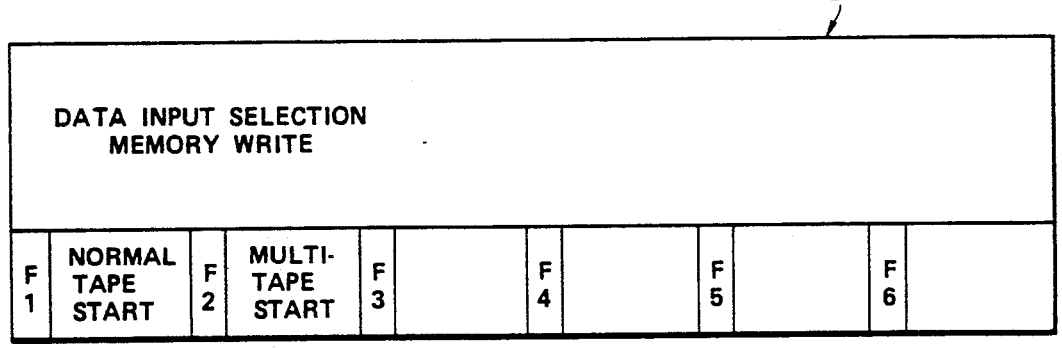

In next step 84, display of the display DPY is changed to "data input selection memory write" mode display state as shown in FIG. 12b and the processing proceeds to next step 85.

In next step 85, data memory address DMA for writing stitch data corresponding to the embroidery design number set in the data RAM 14 is set at a predetermined start address corresponding to this design number.

In next step 86, a paper tape on which the stitch data for the embroidery design to be registered is recorded is set in the paper tape reader 16 and the processing proceeds to next step 87.

In step 87, whether or not the function switch F1 or F2 has been turned on is judged. In this display state, the function corresponding to the function switch F1 is one for "normal tape start" mode setting switch for reading desired stitch data from the paper tape. When a set of stitch data are to be read from one paper tape or stitch data on the last paper tape among plural paper tapes is to be read for combining stitch data of the plural paper tapes into one embroidery design data and registering the combined data, this switch F1 is turned on to select the "normal tape start" mode setting. The function corresponding to the function switch F2 is one for a "multi-tape start" mode setting switch for reading combination of stitch data of plural paper tapes. When stitch data of plural paper tapes are to be combined into data of one embroidery design and registered as the combined data, this switch F2 is turned on at starting of data reading on paper tapes other than the last paper tape to select "multi-tape start" mode setting. If either the function switch F1 or F2 has been turned on, the processing proceeds to step 87 whereas if neither switch has been turned on, the processing stays in step 87 until either one of the switches F1 and F2 is turned on.

In step 88, stitch data for one stitch (X, Y data and the function data) recorded on the paper tape 17 are read by the tape reader 16.

In next step 89, the stitch data for one stitch read in step 88 are written at the address of the data RAM 14 designated by the data memory address DMA and thereafter the data memory address DMA is stepped by one stitch.

In next step 90, whether or not contents of the function data included in the stitch data read in step 88 are the end code is examined. This end code represents the end of stitch data of the embroidery design and also completion of reading operation of stitch data recorded on one paper tape. Accordingly, when contents of the function data are not the end code, the processing returns to step 88 in which reading and memory registering of stitch data for one stitch by the tape input and stepping of the data memory address DMA for one stitch are repeated. When contents of the function code are the end code, the processing proceeds to step 91.

In step 91, whether or not the tape input set in step 40 is "multi-tape start" mode is judged. If it is "multi-tape start" mode, the processing proceeds to step 92 whereas if it is "normal tape start" mode, the processing returns to the main routine.

In step 92, the data memory address DMA is stepped back by one stitch and "end code" written at this address is rewritten to "stop code". The "stop code" designates temporary stopping of rotation of the embroidering machine and not ending of the design. Therefore, the embroidery design is treated as not ending yet though the paper tape has ended with a result that the stitch data further continues. The data memory address DMA is stepped by one stitch and the processing returns to step 86.

The above described steps 86-92 are repeated with respect to other paper tapes to be combined nextly to data of paper tapes which have just been input. If there are still tapes to be combined together, the "multi-tape start" mode is brought about again and the processing proceeds from YES of step 91 to step 92 and returns to step 86. If data of last paper tape of the combination is to be input, the processing returns from NO of step 91 thereby ending reading of the data.

When the memory readout mode has been selected, the processing proceeds from step 81 to step 82. In step 82, a desired design number is set by operation of the ten key switch TKY for reading out stitch data corresponding to a desired embroidery design registered in the data RAM 14. In next step 93, the data RAM 14 is changed to reading mode and the reading address DMA is set at the head address of the stitch data corresponding to the design number for preparing for reading. Then the processing returns to the main routine.

Figures 13A, 13B, 13C:
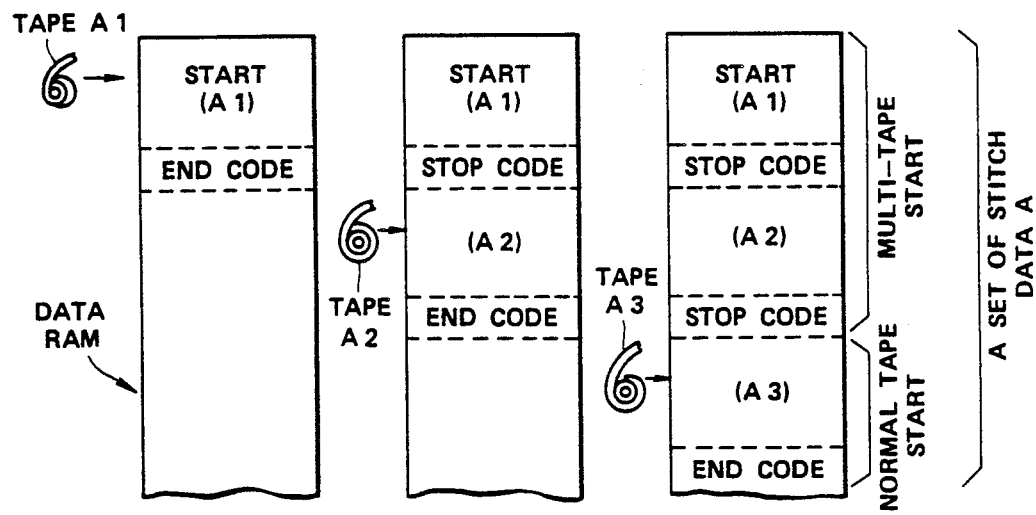
FIGS. 13a through 13c are diagrams showing an example of memory map in the case of combining stitch data corresponding to plural paper tapes into stitch data for a single design and storing it in the data RAM 14.

In the above construction, the functions of the "normal tape start mode" and "multi-tape start" mode during inputting of the paper tape data will be described with reference to the memory map of FIG. 13. By way of example, it is assumed that data of three paper tapes A1-A3 are combined into data of one design A and registered in the memory. First, after executing predetermined setting operations (steps 80-85), the first paper tape A1 is set at the paper tape reader 16 (step 86). Then, the function switch F2 which is set to the function of the "multi-tape start" mode is turned on (step 87) and the design data recorded on the paper tape A1 is read and written at a predetermined address of the data RAM 14 (steps 88-90). This reading operation is repeated until contents of the function data included in the input stitch data become the end code. When the end code has been detected, the end code is written as shown in FIG. 13a and the reading operation is completed (step 90). Since the function is set at the "multi-tape start" mode at this time, the data memory address DMA is stepped back by one stitch and the "end code" of the design of the tape A1 stored in the memory as shown in FIG. 13a is rewritten to "stop code" as shown in FIG. 13b. Then the data memory address DMA is stepped for reading data of next paper tape A2 and writing it in the memory (step 92).

The processing then returns to step 86 in which the paper tape A2 is set in the tape reader 16. The function switch F2 is turned on again, the function is set to the "multi-tape start" mode (step 87) and the same reading operation as the one described above is repeated. The data reading operation on the paper tape A2 ends by writing the end code at the final address of the data as shown in FIG. 13b. The data memory address DMA thereafter is stepped back by one stitch and this "end code" is rewritten to "stop code" as shown in FIG. 13c and the data memory address DMA is stepped for reading data from next paper tape A3 and storing it in the memory.

By setting the function to the "multi-tape start" mode in reading of the paper tape data, the end code stored at the final address of the data written in the memory is rewritten to the stop code thereby to enable reading of a succeeding paper tape and plural tape data groups are registered in the memory as successive stitch data.

Then the processing returns to step 86 in which the last paper tape A3 is set in the tape reader 16. Since this is the last paper tape, in step 87, the function switch F1 is turned on to set the function to the "normal tape start" mode and the above described reading operation is repeated. If contents of the function data included in the input tape data have become the end code, the end code is written in the least significant bit of the data as shown in FIG. 13c thereby ending the reading operation of data from the paper tape A3. This end code is not changed any longer. In other words, since in the "normal tape start" mode, step 91 becomes NO and the processing returns without proceeding to step 92, the end code is not changed. By changing the end codes of the tapes A1 and A2 to the stop code and retaining the end code of the last tape A3 as it is in the foregoing manner, stitch data of plural tapes A1-A3 can be successively combined and stored in the data RAM 14 as stitch data of one embroidery design.

Stitch data consisting of combination of plural designs stored in the data RAM 14 is read in the following manner during running of the embroidering machine and the embroidering operation is performed in accordance with the read out stitch data. First, in the above described stop routine, the operation mode of the embroidering machine to the program mode, the design number of a desired design number to be embroidered is designated by operation of the switch in the operation panel 15, and the head address of stitch data area corresponding to this designated design number is set at the data memory address DMA for preparing for reading stitch data corresponding to this design number (steps 82 and 93). Nextly, the operation mode is changed to the running mode and the start/stop switch 26 is turned to the start switch ON state to enter the running routine. In the running routine, the embroidering machine main shaft motor 22 is driven and rotated and stitch data for each stitch is sequentially read from the data RAM 14 for each stitch of the stitching operation to enable respective running processings for the embroidering operation to be executed in accordance with this stitch data. For example, in a case where stitch data consisting of combination of data of the tapes A1-A3 as shown in FIG. 13c is read from the data RAM 14, stitch data corresponding to the tape A1 are sequentially read out first and, when contents of the read out data have become the stop code, rotation of the embroidering machine main shaft motor 22 is once stopped. At this time, after executing processings which are executed during stoppage of the embroidering machine such as color changing, the processing proceeds to reading of stitch data corresponding to the next tape A2. Upon completion of reading of this data, the same processing as the one described above is executed by the stop code and thereafter reading of stitch data corresponding to the next tape A3 is executed. In this manner, the last stitch data are successively read out until the end code has been detected when the embroidering machine ends the series of stitching operation.

As described above, stitch data for plural designs are combined to continuous stitch data corresponding to one embroidery design and stored in the data RAM 14 and, when an embroidering operation is performed by reading this stitch data, designation of one design number enables data of the plural designs composing the embroidery design corresponding to this design number to be continuously read out.

The display method of the display DPY in the operation panel 15 is not limited to quartz display but electric and electronic devices such as CRT display and LED display and hardware device such as a printer may also be employed.

In the above described embodiment, as shown in FIG. 13, data corresponding to one design obtained by combining data of plural paper tapes is stored at successive addresses of the data RAM 14. The method of storing data is not limited to this but data corresponding to plural paper tapes may be stored at unsuccessive memory addresses as in the memory bank change system.

As the external recording device for stitch data, not only paper tapes but any other recording medium such as magnetic tapes, magnetic discs, optical discs, magnetic cards and IC cards may be used. In this case, if the recording medium is of a large capacity, data for many designs may be recorded on one recording medium and the present invention can be carried out by selectively combining one or desired plural designs.

In the above described embodiment, combination of one or desired plural paper tapes, i.e., design data, is set by operation of the "multi-tape start" mode setting switch and the "normal tape start" mode setting switch. The manner of combining the design data is not limited to this but combination of one or desired plural design data may be set by utilizing other methods. For example, the number of designs to be combined may be preset before inputting design data and the processing for combining the number of design data thus set may be carried out in accordance with the above described embodiment.

Figure 14:
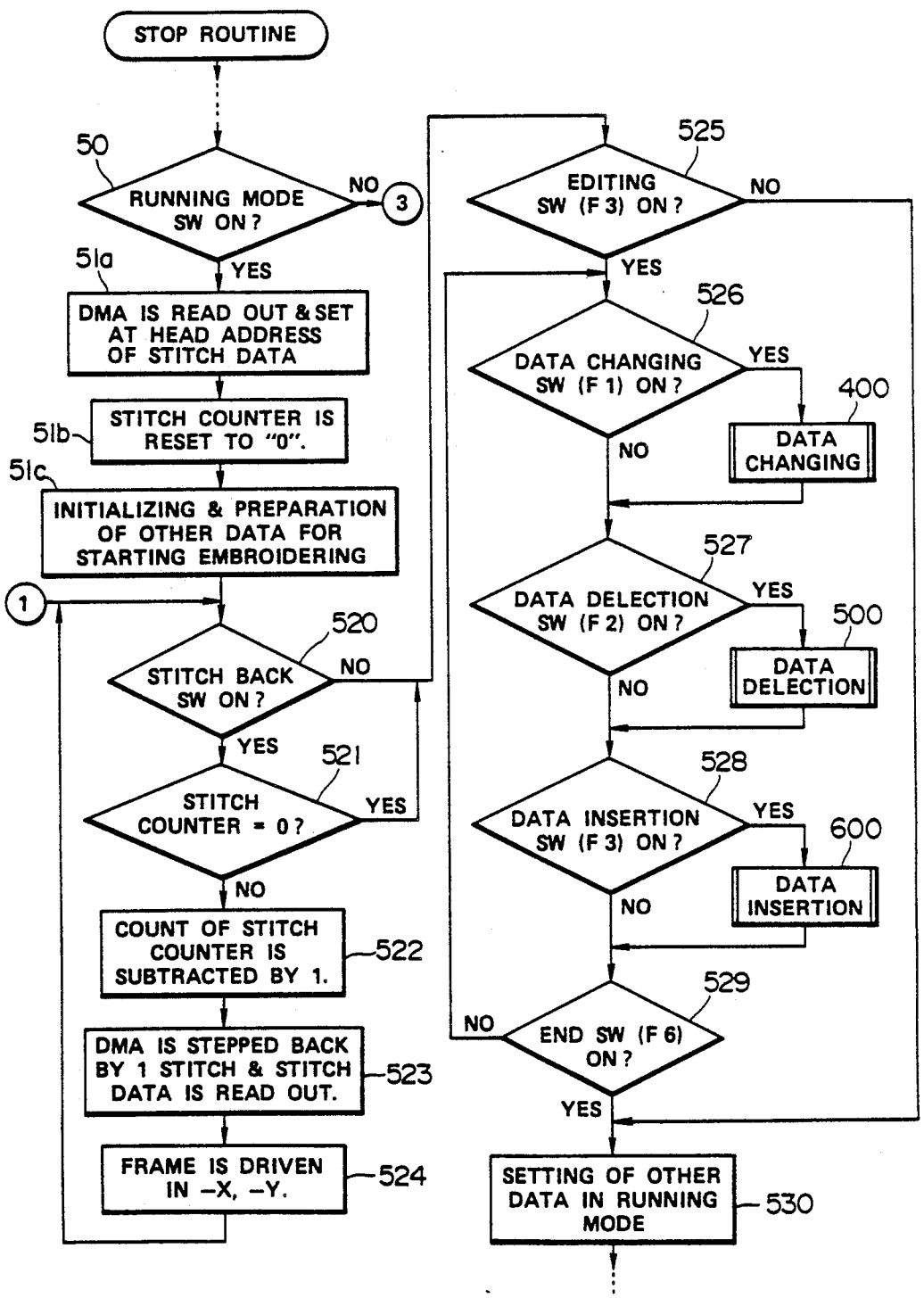
FIG. 14 is a flow chart showing a modified example of embroidering machine main shaft stop routine in still another embodiment of the invention.

With reference to FIG. 14, description will now be made about an embodiment capable of temporarily stopping running of the embroidering machine in the course of the embroidering operation and thereby capable of a stitch data editing operation such as change in embroidering data.

FIG. 14 shows a routine in the running mode in the embroidering machine main shaft stop routine and corresponds to the portion of steps 50, 51 and 52 in FIG. 6b. Step 50 corresponds to step 50 of the same reference numeral in FIG. 6b, steps 51a–51c correspond to step 51 of FIG. 6b and steps 520–530 correspond to step 52 of FIG. 6b. Step 53 of FIG. 6b comes after step 530 of FIG. 14, though illustration thereof is omitted.

As described above, upon turning on of the running mode switch SW3, the operation mode is changed from the program mode to the running mode. During a period of time immediately after changing to the running mode, there is executed a processing for initializing respective data for starting the embroidering operation such as setting of the data memory address DMA used for reading stitch data from the data RAM 14 at the head address corresponding to the first stitch (step 51a). In a case where similar processing is executed in step 61 of FIG. 8 or step 90 in FIG. 11, this step 51a may be omitted.

In next step 51b, count of a stitch counter is reset to "0". The stitch counter designates the order of respective stitches for performing the embroidering operation.

In next step 51c, initializing and preparation processings for starting the embroidering operation are executed with respect to other data.

In next step 520, whether or not a stitch back switch has been turned on is judged. The stitch back switch is turned on by continuing a stop switch ON state of the start/stop switch 26. If result is YES, the processing proceeds to step 521 in which a stitch back processing is executed. If result is NO, the processing proceeds to step 525 in which a routine for setting desired data in the data editing mode is executed.

In step 521, whether or not count of the stitch counter is "0" is examined. In other words, whether or not the embroidery frame 20 is in the start position of the embroidery design is examined. If the count is "0", this step 521 becomes YES and the processing jumps over step 525 without executing the stitch back operation. If the count is not "0", this step 521 becomes NO and the processing proceeds to step 522.

In step 522, a count for one stitch is subtracted from the current count of the stitch counter.

In next step 523, the data memory address DMA is stepped back by one stitch and stitch data for one stitch is read from this address.

In next step 524, the embroidery frame 20 is driven in reverse direction (by −X, −Y) in response to stitch data (X, Y) for one stitch read out in step 523 thereby executing the stitch back operation for one stitch. Then, reverting to step 520, whether or not the stitch back switch is still ON is examined. If the switch is ON, the above described processings of steps 521–524 are repeated.

Figure 20A:
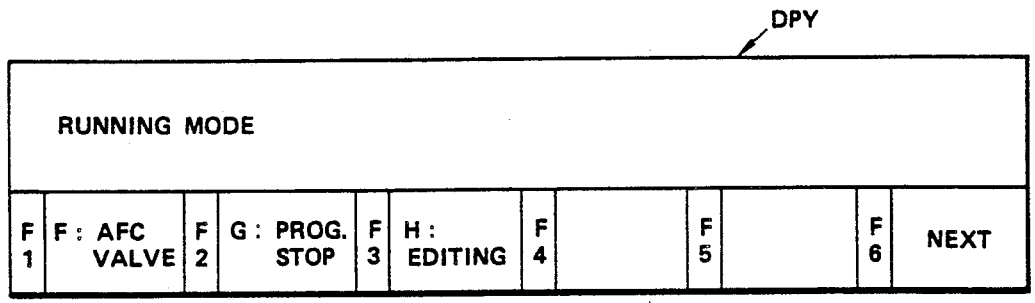
FIGS. 20a and 20b are plan views showing examples of display in the display unit during execution of the processing of FIG. 14.

In FIG. 14, in step 525, display of the display DPY in the running mode is changed to a display state as shown in FIG. 20a and whether or not the function switch F3 functioning as "data editing mode switch" has been turned on is judged. This switch F3 is turned on for editing stitch data stored in the data RAM 14. Thereupon the display state of the display DPY is changed to one shown in FIG. 20b and a desired data editing mode can be selected by turning on one of the function switches F1–F3. In this case, the function switch F1 functions as a switch operated for setting a "data changing" mode in which stitch data under operation is changed. The function switch F2 functions as a switch operated for setting a "data deletion" mode in which stitch data under operation is deleted. The function switch F3 functions as a switch operated for setting a "data insertion" mode in which new other data is inserted in stitch data under operation. The function switch F6 functions as the finish switch for escaping from the "editing mode". In step 525, if the function switch F3 functioning as the "editing mode" setting switch has been turned on, the processing proceeds to step 526 whereas if this switch has not been turned on, the processing proceeds to step 530.

Figure 20B:
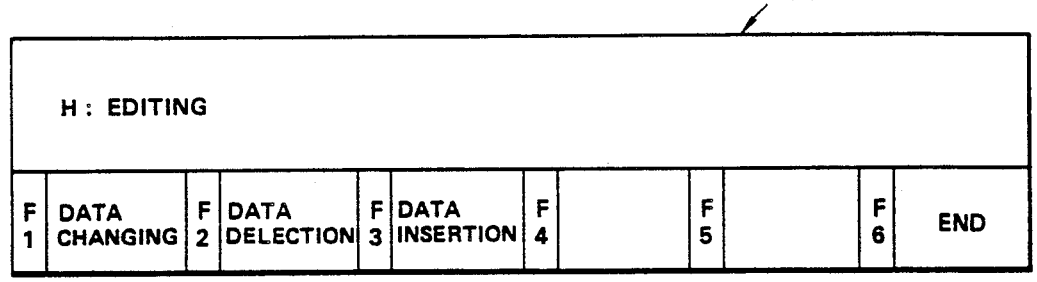

In step 526, whether or not the function switch F1 which functions as the "data changing mode" switch as shown in FIG. 20b has been turned on is judged. If the switch F1 is ON, the processing proceeds to a subroutine (FIG. 15) for executing data changing processing step 400 to be described later. If this switch F1 is not ON, this step 526 becomes NO and the processing proceeds to step 527.

In step 527, whether or not the function switch F2 functioning as the "data deletion mode" switch has been turned on is examined. If this switch F2 is ON, the processing proceeds to a subroutine (FIG. 16) for executing data deletion processing (step 500) to be described later. If this switch F2 is not ON, the processing proceeds to step 528.

In step 528, whether or not the function switch F3 functioning as the "data insertion mode" setting switch has been turned on is examined. If this switch F3 is ON, the processing proceeds to a subroutine (FIG. 17) for executing data insertion processing (step 600) to be described later. If this switch F3 is not ON, the processing proceeds to step 529.

In step 529, whether or not the function switch F6 functioning as a switch declaring the end of data editing has been turned on is examined. If this switch F6 is ON, this step 52 becomes YES and the screen of the display DPY is changed to the initial display state in the running mode. Then, the processing proceeds to step 530. If this switch F6 is not ON, this step 529 becomes NO and the processing returns to step 526 in which the above described steps 526–529 are repeated.

Figures 17, 18:
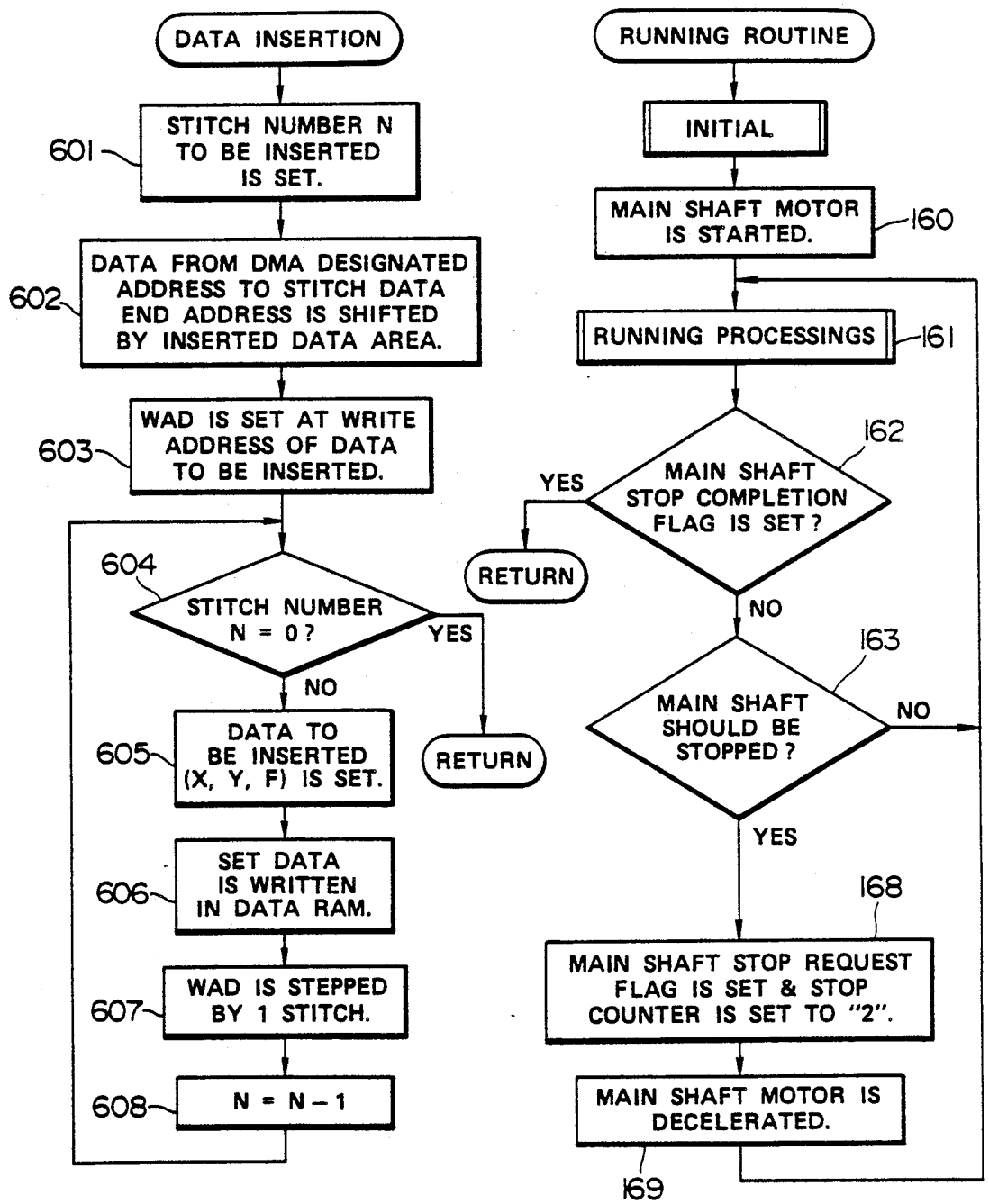
FIG. 17 is a flow chart showing an example of data insertion processing subroutine in FIG. 14.
FIG. 18 is a flow chart showing an example of embroidering machine main shaft running routine in the main routine of FIG. 5.

In step 530, setting of respective other data in the running mode is executed. The processing then proceeds to step 53 (FIG. 6b) in which whether or not the start switch ON state has been brought about by the start/stop switch 26 is examined. If the start switch is ON, the processing returns to the main routine and enters the running routine (FIG. 18).

Figure 15:
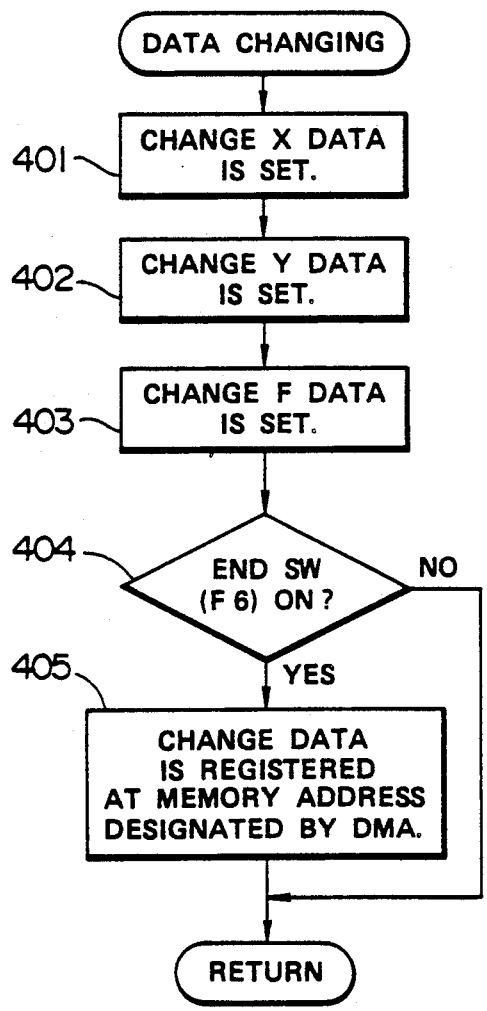
FIG. 15 is a flow chart showing an example of data change processing subroutine in FIG. 14.

Referring now to the flow chart of FIG. 15, description will now be made about the data changing subroutine in the "data editing mode" of the stop routine shown in FIG. 14.

In step 401, desired changed value of X-axis drive data concerning the current stitch in stitch data corresponding to the embroidery design under operation (i.e., embroidery design corresponding to the design number set in step 58 in FIG. 8 or step 82 in FIG. 11) is set by operation of the ten key switch TKY.

In next step 402, desired changed value of Y-axis drive data concerning the current stitch is set in the same manner as in step 401. Then the processing proceeds to next step 403.

In step 403, in the same manner as in steps 401 and 402, a desired change code of a function data concerning the current stitch (hereinafter referred to as "F data") is set.

In next step 404, whether or not the function switch F6 functioning as a change "end switch" in the function switch explanation section DPY2 has been turned on is judged. If a changed value or change code of desired X, Y, F data concerning the current stitch has been set, the function switch functioning as the change "end switch" is turned on. If this switch is ON, the processing proceeds to step 405 whereas if this switch is not ON, the processing returns to the routine of "data editing mode".

In step 405, the set change data is written at an address of the data RAM 14 designated by the current data memory address DMA (i.e., address corresponding to the current stitch).

The "current stitch" in this case means a stitch corresponding to the address designated by the data memory address DMA of the data RAM 14, i.e., a stitch next to a stitch at which the embroidering operation was executed immediately before entering this stop routine (i.e., a stitch at which stitching is to be made nextly) or a stitch which has been stepped back by several stitches by the stitch back processing in steps 47, 80–83.

Figure 16:
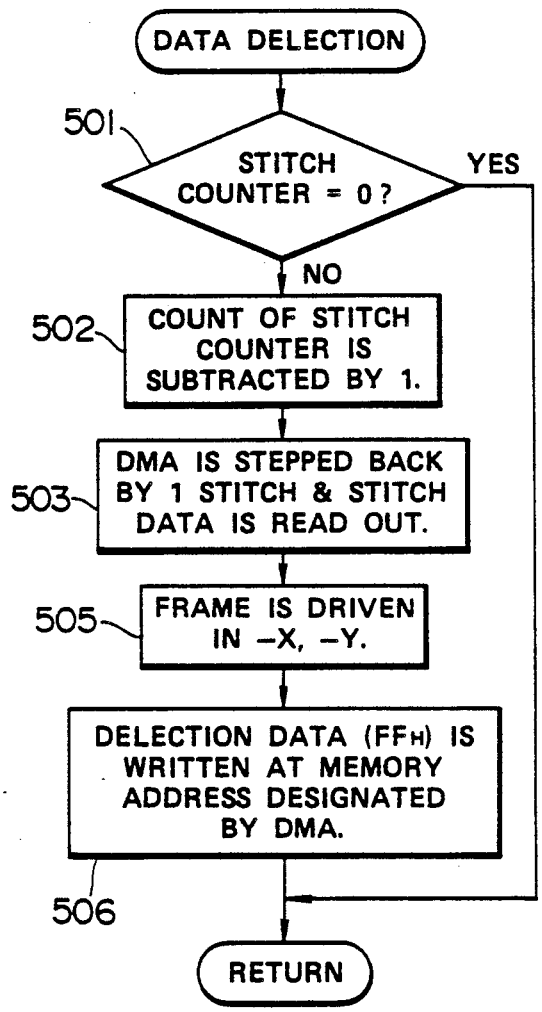
FIG. 16 is a flow chart showing an example of data deletion processing subroutine in FIG. 14.

Nextly, the deletion subroutine in the "data editing mode" will be described with reference to the flow chart of FIG. 16.

In step 501, whether or not the count of the stitch counter is "0" is examined. In other words, whether or not the current embroidery frame 20 is at the embroidering operation start position is judged. If the count is "0", this step 501 becomes YES and the processing returns to the routine of the "data editing mode". Since deletion of data can be made for a stitch which precedes the "current stitch" by one stitch, "0" stitch does not exist so that deletion of data cannot be made. If the count is not "0", this step 501 becomes NO and the processing proceeds to step 502.

In step 502, the count of the stitch counter is subtracted by 1.

In next step 503, the data memory address DMA is stepped back by one stitch.

In next step 504, stitch data for one stitch is read from the address of the data RAM 14 designated by the data memory address DMA.

In next step 505, the embroidery frame 20 is driven in the reverse direction by $-X$ and $-Y$ in accordance with X and Y drive data in the stitch data read from the data RAM 14 in step 504 and the embroidery frame 20 is stepped back by one stitch.

In next step 506, deletion data for one stitch (X=FFH, Y=FFH, F=FFH where FFH represents maximum value in 2-digit hexadecimal numeration) is written at the address of the data RAM 14 designated by the data memory address DMA. In other words, desired stitch data for one stitch (X, Y, F) to be deleted is rewritten into FFH which is blank data so as not to execute the embroidering operation at this stitch and the processing returns to the "data editing mode".

The data insertion subroutine in the "data editing mode" will now be described with reference to the flow chart of FIG. 17.

In step 601, stitch number N of desired stitch data to be inserted is set by operation of the ten key switch TKY.

In step 602, data from the address of the data RAM 14 designated by the current data memory address DMA to the end address of the stitch data is shifted reversely by an address area corresponding to the inserted stitch number N set in step 601.

In next step 603, the address of the data RAM 14 designated by the current data memory address DAM is set as write address WAD designating an address at which desired stitch data to be inserted is written.

In next step 604, whether or not the stitch number N set in step 601 is "0" is judged. In other words, presence or absence of stitch data to be inserted is judged. Since the condition N<1 is satisfied here, this step 604 becomes YES and the processing proceeds to step 65. If all of the stitch data to be inserted has been written in the data RAM 14 and the stitch number N has become N20, this step 604 becomes YES and the processing returns to the routine of the "data editing mode".

In step 605, desired stitch data for one stitch to be inserted (X, Y, F) is set by operation of the ten key switch TKY.

In next step 606, stitch data set in step 65 is written at the address of the data RAM 14 designated by the write address WAD.

In next step 607, the write address WAD is stepped by one stitch.

In next step 608, 1 is subtracted from the stitch number N set in step 601 and the processing returns to step 604 and the processings in steps 604–608 are repeated until the setting of the stitch data to be inserted has been completed.

Nextly, an example of the running routine employed in this embodiment will be described with reference to FIG. 18.

As shown in FIG. 18, after a predetermined initializing processing, the processing proceeds to step 160.

In step 160, the embroidering machine main shaft motor 22 is started.

In next step 161, respective running processings for the embroidering operation are executed.

In next step 162, whether or not an embroidering machine main shaft stop completion flag is set is examined. If the flag is set, step 162 becomes YES and thereafter the processing returns to the main routine. If the flag is not set, this step 162 becomes NO and the processing proceeds to step 163.

In step 163, whether or not the embroidering machine main shaft stop condition has been satisfied is examined. If the start/stop switch 26 is the stop switch ON state or shortage of thread has occurred, it is judged that the main shaft should be stopped. If contents of the function data are the color change code or the end code representing completion of the embroidery design, it is judged that the main shaft should be stopped. When step 163 is YES, the processing proceeds to step 168 and when step 163 is NO, the processing proceeds to step 161.

In step 168, an embroidering machine stop request flag is set and the stop counter is set to numerical value "2" and the processing proceeds to next step 169.

In step 169, the embroidering machine main shaft motor 22 is decelerated and then the processing proceeds to step 161.

Figure 19:
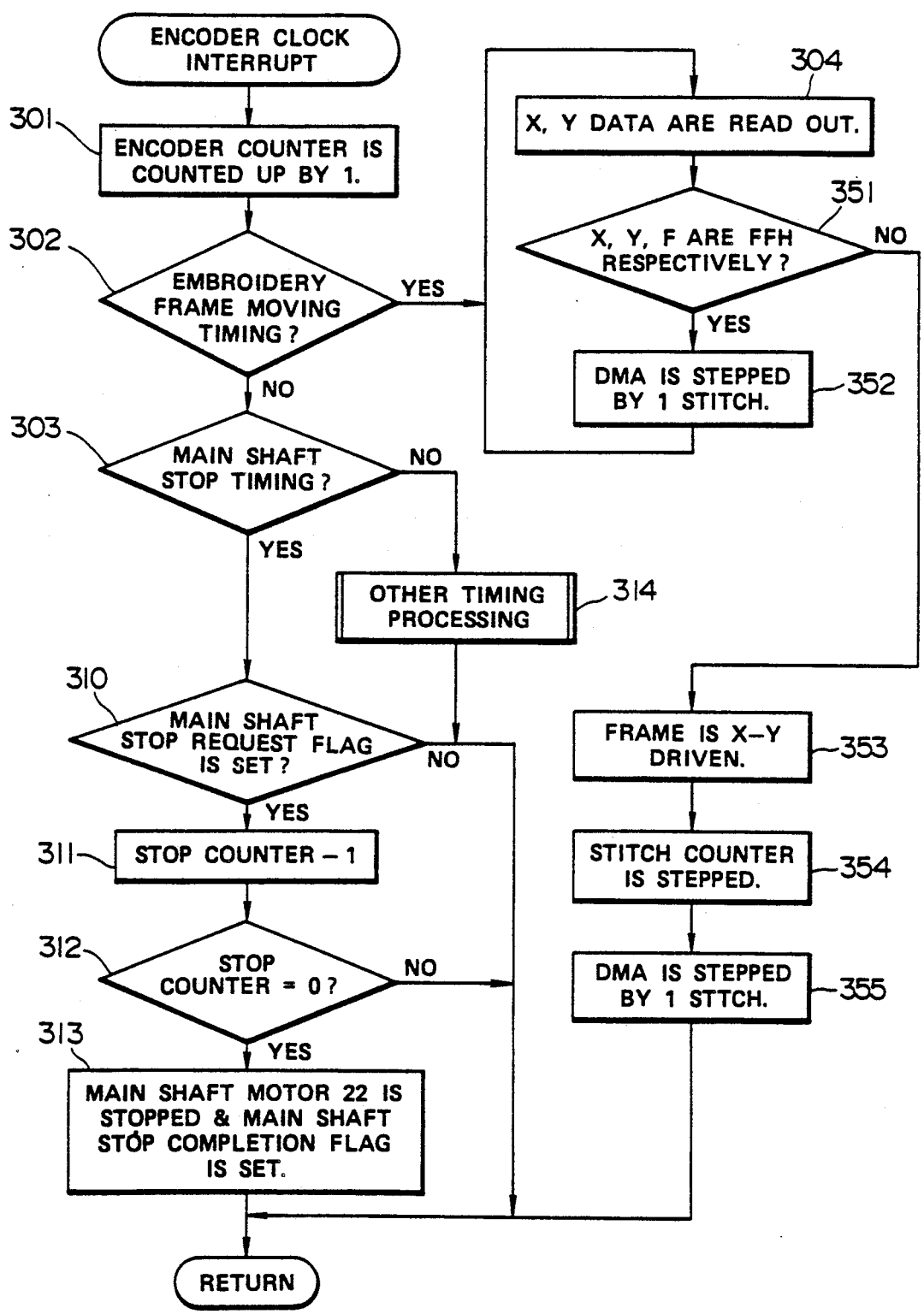
FIG. 19 is a flow chart showing an example of encoder clock interrupt subroutine executed in the embroidering machine main shaft running routine in FIG. 18.

If a clock signal is supplied from a rotary encoder 24 during the main shaft running routine, encoder clock interrupt subroutine as shown in FIG. 19 is executed.

In the encoder clock interrupt subroutine, an encoder counter is counted up by 1 (step 301) and, thereafter, which processing timing the count value corresponds to is successively judged (steps 302, 303) and processings corresponding to the respective timings are performed. At the timing of moving the embroidery frame 20, X, Y data and function data corresponding to the current embroidery stitch are read from the data RAM 14 in response to the output of the stitch counter (step 304). Whether or not the read out data is the data for which the data deletion processing has been executed (X=FFH, Y=FFH, F=FFH) is examined (step 351). If result is YES, the data memory address DMA is stepped by one stitch (step 352) and the processing returns to step 304 in which the processing for reading out stitch data for one stitch from the data RAM 14 is repeated. Thus, the data memory address DMA is stepped until the data of the deletion data has been read out. If contents of the stitch data read from the data RAM 14 are not the data for which the data deletion processing has been executed, the embroidery frame 20 is X-Y moved in response to the X, Y data (step 353) and, thereafter, the stitch counter is stepped to next stitch (step 354) and the data memory address DMA is stepped by one stitch (step 355) and the processing returns to the main running routine (step 355).

If the timing is the embroidering machine main shaft stop timing, whether or not the embroidering machine main shaft stop request flag is set is examined (step 310). If result is YES, the stop counter is counted down by 1 count and whether or not the count value has been reduced to zero is judged (steps 311 and 312). If the count value has been reduced to zero, the embroidering machine main shaft motor 22 is stopped and the embroidering machine main shaft stop completion flag is set (step 313). The jump control and other processings are executed by other timing processing (step 314).

In the above described construction, processings in the "data editing mode" for executing change, deletion, or insertion of new data in the pattern of the embroidery design (i.e., stitch data) under operation will now be described.

If, during the embroidering operation of a certain embroidery design, it is desired to change this embroidery design, rotation of the embroidering machine main shaft is stopped by turning on of the stop switch by operation of the start/switch 26 and the processing proceeds to the stop routine of the main routine in which the operation mode of the embroidering machine is judged to be the running mode (steps 30 of FIG. 6a). In this running mode, the display state of the display DPY initially is one as shown in FIG. 20a. The function switch F3 functioning as the "data editing mode switch" is turned on (step 525) to change the mode to the one for executing the data editing and the display state of the display DPY is changed to the one shown in FIG. 20b. By turning on a desired function switch, a desired editing processing can be executed for stitch data under operation stored in the data RAM 14.

Figure 21A:
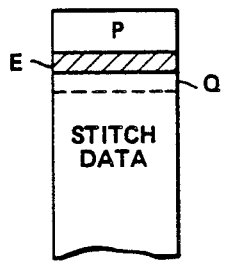
FIGS. 21a through 21c are diagrams showing an example of memory map in the data RAM 14 during editing of data.

The data change processing will first be described with reference to the memory map of FIG. 21a. An address area P is one in the data RAM 14 storing stitch data for which the embroidering operation has already been completed. At the last address E of this address area P is stored stitch data at a time point at which the embroidering machine main shaft was stopped for executing the data change processing. After completion of outputting of the embroidery frame drive data at this last stitch (i.e., address E), the data memory address data DMA is stepped to next address (step 355). Address Q which is designated by the current data memory address DMA therefore is an address next to the address E and stitch data for performing stitching operation at a next switch is stored at this address Q. Contents of stitch data for one stitch stored in the address Q are subject to the data changing processing. New stitch data (X, Y, F) to be substituted for is set by operation of the ten key switch TKY (steps 401–403). Then, by turning on of the function switch F6 functioning as the data input "end switch" (step 404), the input data is written in the address Q. In other words, contents of the data at the address Q at which stitch data of next stitch is stored are rewritten and the embroidering operation is executed continuously from this address Q again.

Figure 21B:
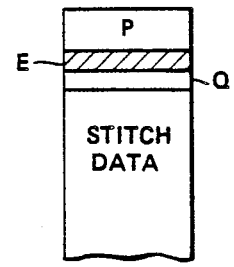

Referring now to the memory map of FIG. 21b, the data deletion processing will be described.

The address Q is an address designated by the current data memory address DMA and an address which is next to the last address at the time of completion of outputting of embroidery frame drive data when the embroidering machine main shaft has been stopped for executing the data deletion processing. At the address E is stored stitch data of stitch at which stitching operation was performed during stoppage of the embroidering machin main shaft and this data is subject to deletion. The count of the stitch counter is subtracted by 1, the data memory address DMA is stepped back by one stitch and stitch data for this one stitch is read from the data RAM 14 (steps 501-503). In accordance with the read out stitch data, the embroidery frame 20 is drive in −X and −Y directions (step 505) to move back the embroidery frame 20 by one stitch. Then, stitch data for one stitch at the address E designated by the data memory address DMA is rewritten into deletion data (X=FFH, Y=FFH, F=FFH). By the writing the deletion data, all stitch data at this stitch becomes invalid.

Figure 21C:
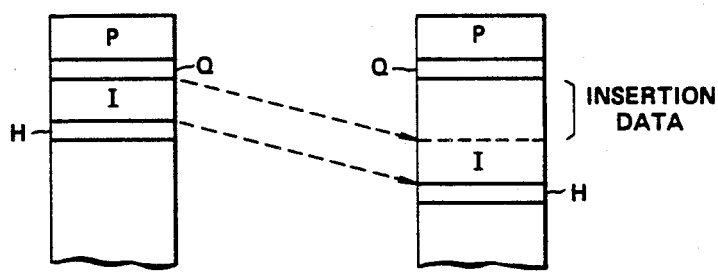

Nextly, the data insertion processing will be described with reference to FIG. 21c.

Address Q is an address designated by the current data memory address DMA and an address next to the last address E at the time of completion of outputting of embroidery frame drive data when the embroidering maching main shaft has been stopped for executing the data insertion processing. Remaining portion of stitch data for which the embroidering operation has not been executed is stored in an address area I between the address Q and the last address H of the embroidery design. Desired new stitch data is inserted in an address area between the address area P and the address area I. First, stitch number N of desired stitch data to be inserted is set by operation of the ten key switch TKY and the address area I is shifted back by an address area corresponding to the stitch number N 8 step (602). The data memory address DMA is set at the insertion data write address (step 604). Desired stitch data to be inserted (X, Y, F) are set by operation of the ten key switch TKY and written in the data RAM 14 (steps 604-606). The data memory address DMA is stepped by one stitch (step 607) to prepare for writing of next data to be inserted. Thus, setting of stitch data for one stitch is repeated until data of the stitch number N have all been written in the data RAM 14. Upon completion of setting and writing of data to be inserted, the data memory address DMA is set at the address Q to resume the embroidering operation continuously from the stitch data at the stitch at which the data has been inserted.

By utilizing the stitch back operation, the following embroidering data editing work may also be performed. If, during the embroidering operation, stitching is temporarily stopped and, upon confirming the actual embroidery design which has so far been embroidered, a desired embroidered design portion therein is changed or deleted or new design portion is inserted in this embroidered portion, the stitch back switch is turned on to move back the embroidery frame 20 in reverse directions (by −X, −Y) to a desired stitch. Editing of stitch data concerning stitch at which change, deletion or insertion is to be made is executed in accordance with the above described respective subroutines for change, deletion and insertion of data (FIGS. 15-17).

The steps of editing processings such as change, deletion and insertion of data are not limited to the above described embodiment. For example, in the above described embodiment, "data change" is carried out with respect to current stitch designated by the data memory address DMA (i.e., stitch at which the embroidering operation should be made nextly). Alternatively, it may be made with respect to the stitch which precedes the current stitch by one stitch.

The data editing means for executing the editing processings such as change, deletion and insertion of data is not limited to the means according to the softwart processings in the above described invention but may be constructed of a hardware device provided exclusively for this purpose.

Further, in the above described embodiment, starting, stopping and stitch back of the embroidering machine are controlled by operation of a common bar switch. Alternatively, these operations may be controlled by separate switches.

An embodiment capable of transmitting and receiving stitch data and control data between the embroidering machine and an external device by using a communication function will be described with reference to FIG. 22.

In this embodiment, as an operation modes, there is a "remote mode" in addition to the above described program mode and running mode. The remote mode is an operation mode in which transmission and receiving of stitch data and control data are made between this embroidering machine and an external device 28 having a communication function through a communication interface 27. A remote mode switch SW6 (FIG. 3) is provided in the operation panel 15. This remote mode switch SW6 is a switch operated when the operation mode of this embroidering machine is set to the remote mode.

Figure 22:
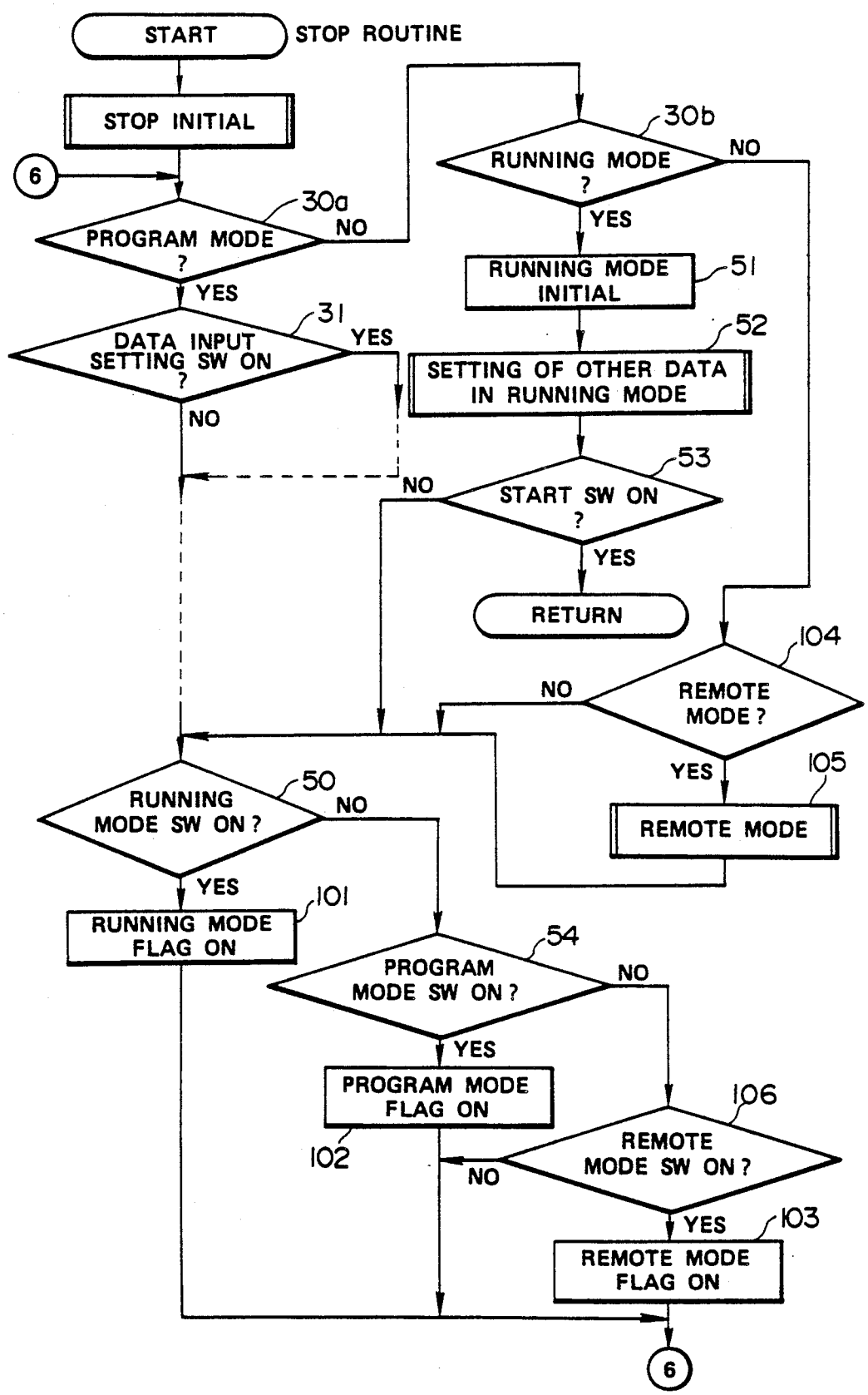
FIG. 22 is a flow chart showing a modified example of the embroidering machine main shaft stop routine in still another embodiment of the invention.

FIG. 22 shows an embroidering machine main shaft stop routine which is a modification of the routine shown in FIGS. 6a and 6b. Step 30 in FIG 6a is modified to steps 30a and 30b in FIG. 22. The subsequent processings from step 31 in FIG. 6a to steps 46 and 47 in FIG. 6b can be used without modification in FIG. 22 so that illustration of these steps is omitted. The portion of steps 50–54 in FIG. 6b is modified to steps 50, 54, 101, 102, 103, 106, 30a, 30b, 51, 52, 53, 104 and 105 in FIG. 22.

In FIG. 22, in step 30a, whether or not the operation mode is the program mode is examined in accordance with contents of the operation mode flag. If it is the program mode, the processing proceeds to step 31 and subsequent steps in which the same processings as those during the program mode described with reference to FIGS. 6a and 6b are executed. If the operation mode is not the program mode, the processing proceeds to step 30b in which whether or not the operation mode is the running mode is examined.

If the operation mode is the running mode, processings of steps 51, 52 and 53 which are the same as those shown in FIG. 6b are executed. In the running mode, if the start switch is one, the processing returns to the main routine and enters the running routine. If the start switch is not ON, the processing proceeds from step 53 to step 50 in which whether or not the running mode switch SW3 has been turned on is examined.

If the operation mode is not the running mode, step 306 becomes NO and the processing proceeds to step 104 in which whether or not the operation mode is the remote mode is examined in accordance with the operation mode flag. If the operation mode is the remote mode, the processing proceeds to step 105 in which a remote mode subroutine (FIG. 23) to be described later is executed. Then, the processing proceeds to step 50.

In step 50, whether or not the running mode switch SW3 has been turned on is examined. If result is YES, the running mode flag is set to ON (step 101) and the processing returns to step 30a. If result is NO, the processing proceeds to step 54.

In step 54, whether or not the program mode switch SW2 has been turned on is examined. If the program switch SW2 is ON, the program mode flag is set to ON (step 102) and the processing returns to step 30a.

If the program mode switch SW2 is not ON, step 54 becomes NO and the processing proceeds to step 106.

In step 106, whether or not the remote mode switch SW6 has been turned on is examined. If switch data and control data are to be transmitted and receivied between the embroidering machine and the external device 28 through the communication interface 27, the remote mode switch SW6 is turned on. If the switch SW6 is ON, the remote mode flag is set to ON (step 103) and the processing returns to step 30a. If result is NO, the processing proceeds to step 30a jumping over step 103.

Figure 23:
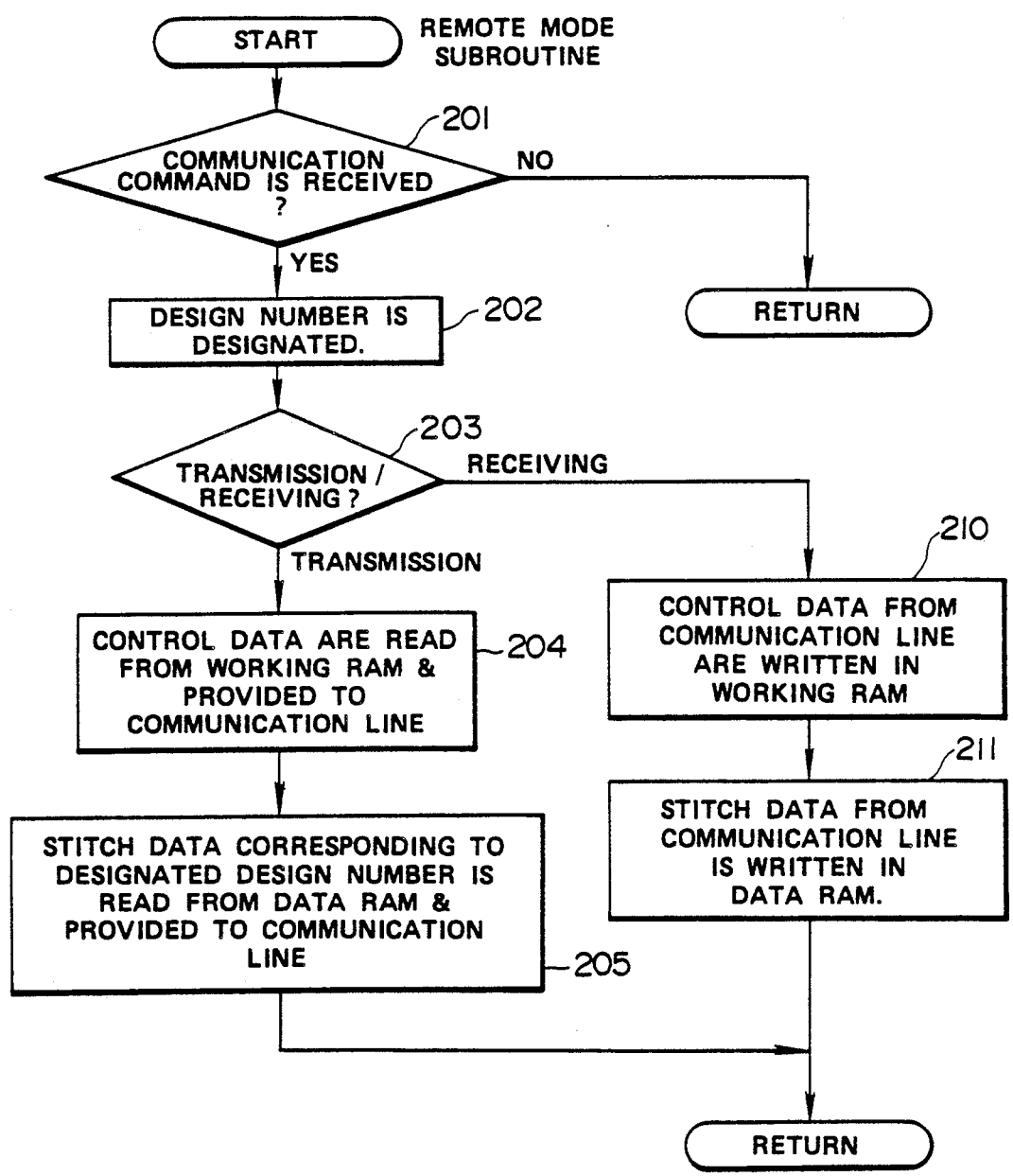
FIG. 23 is a flow chart showing an example of remote mode subroutine in FIG. 22.

With reference to FIG. 23, "remote mode subroutine" will now be described.

In step 201, a status register of the communication interface 27 is examined to judge whether or not a communication command has been received from the external device 28. If result is YES, the processing proceeds to step 202 whereas if result is NO, the processing returns to the stop routine of FIG. 22.

In step 202, a desired design number is designated by operation of the ten key switch TKY. If data is to be transmitted, a design number of an embroidery design corresponding to stitch data to be read from the data RAM 14 is deisgnated whereas if data is to be received, a design number of an embroidery deisgn corresponding to stitch data to be written in the data RAM 14 is desiganted.

In next step 203, the status register of the communication interface 27 is examined to judge whether or not the communication command is transmission or receiving of the data. If the communication command is transmission of data, this step 203 becomes YES and the processing proceeds to step 240 for executing processings for transmitting the data. If the communication command is receiving of data, this step 203 becomes NO and the processing proceeds to step 210 for executing processings for receiving the data.

In step 204, respective control data are read from the working RAM 13 and provided to the communication line through the communication interface 27.

In next step 205, stitch data corresponding to the design number designated in step 202 is read from the data RAM 14 and provided to the communication line through the communication interface 27 and the processing returns to the stop routine of FIG. 22.

In step 210, the respective control data received from the communication line through the communication interface 27 are written in the working RAM 13.

In next step 211, stitch data received from the communication line through the communication interface 27 is written in a predetermined address area in the data RAM 14 corresponding to the design number designated in step 202 and the processing returns to the stop routine of FIG. 22.

In the above described construction, transmission and receiving of stitch data and control data are made between the embroidering machine and the external device 28 through the communication interface 27, the remote mode subroutine is executed by processing of the stop routine (FIGS. 22 and 23). The status register in the external device 27 is examined to judge whether or not a communication command is received from the external device 28 (step 201). If there is a communication command, a design number corresponding to stitch data to be transmitted to the external device 28 or a design number corresponding to stitch data to be received from the external device 28 is designated (step 202). The status register of the communication interface 27 is examined again to judge whether or not the communication command from the external device 28 is transmission of data or receiving of data (step 203). If the communication command is tranmission of data, control data is read from the working RAM 13 and transferred to the external device 28 through the communication interface 27 (step 204). Further, stitch data corresponding to the designated design number is read from the data RAM 14 and transferred to the external device 28 through the interface 27 (step 205). At this time, in the external device 28, it is possible to edit the transmitted or received data and it is also possible to store and conserve it in the memory. When the communication command is receiving of data, control data is received from the external device 28 through the communication interface 27 and written in the working RAM 13 (step 210). Then, stitch data is received from the external device 28 through the communication interface 27 and written in an address area of the data RAM 14 desiganted by the data memory address DMA corresponding to the designated design number (step 211).

In the above described embodiment, setting and other processings of the communication function of stitch data and control data are executed by the software processing utilizing the microcomputer system. Altrnatively, these processings may be executed by a hardware circuit provided exclusively for this purpose.

Control data may be set individually for each embroidery deisgn and respectively stored in the data RAM 14. Control data pack in this data RAM 14 may be transmitted and received with corresponding stitch data between the embroidering machine and the external device 28 through the communication interface 27 or registered in a paper tape or other external memory device.

The control sysem of the automatic embroidering machine may be connected to a communication network provided for general purposes so that stitch data of embroidery design and control data may be supplied from a computer system in a remote place.

Nextly, an embodiment capable of displaying a desired embroidery design on a display screen and designating a desired stitch at which changing, setting or other processing of stitch data including function data is to be made on the screen by operation of a cursor or the like thereby enabling editing of data will be described.

The hardware structure of this embodiment is shown in FIG. 24. This embodiment comprises, in addition to a structure similar to that of FIG. 2, a graphic memory GPM which is connected to the CPU 11 (FIG. 2) through a bus 29.

The graphic memory GPM stores graphic data for displaying a picture in the display DPY of the operation panel 15 and consists of a RAM. For example, graphic data for displaying an embroidery design or other various graphic data are stored in this graphic memory GPM. In this case, the display DPY consists, for example, of a CRT color display and displays, in color, a picture such as an embroidery design in response to graphic data read from the graphic data memory GPM and also displays other necessary characters and designs.

In this embodiment, the operaiton panel 15 further comprises switches SW10, SW11 and SW12.

The stop code registration switch SW10 is a switch operated when "stop code" is to be registered as function data in correspondence to a desired stitching operation step.

The forward switch SW11 is a switch operated for moving the cursor display in the display DPY forwardly stitch by stitch.

The back switch SW12 is a switch operated for moving the cursor display in the display DPY rearwardly stitch by stitch.

Functions of these switches SW10-SW12 may be assigned to the function switches F1-F6.

In a case where, for editing stitch data, an embroidery design corresponding to the stitch data is displayed in the display DPY, a cursor is displayed with the embroidery design and a desired stitch at which changing or modification of stitch data should be made is designated by this cursor. By moving the cursor position forwardly or rearwardly stitch by stitch by operation of the forward switch SW11 or back switch SW12, the desired stitch at which changing or modification of stitch data (X, Y data and function data) should be made is designated.

"Stitch data editing processing" in this embodiment is executed during the program mode in the embroidering machine main shaft stop routine. A case where "stop code" designating changing of color of thread etc. is set and registered will be described below as an example of the "stitch data editing processing".

Figure 25A:
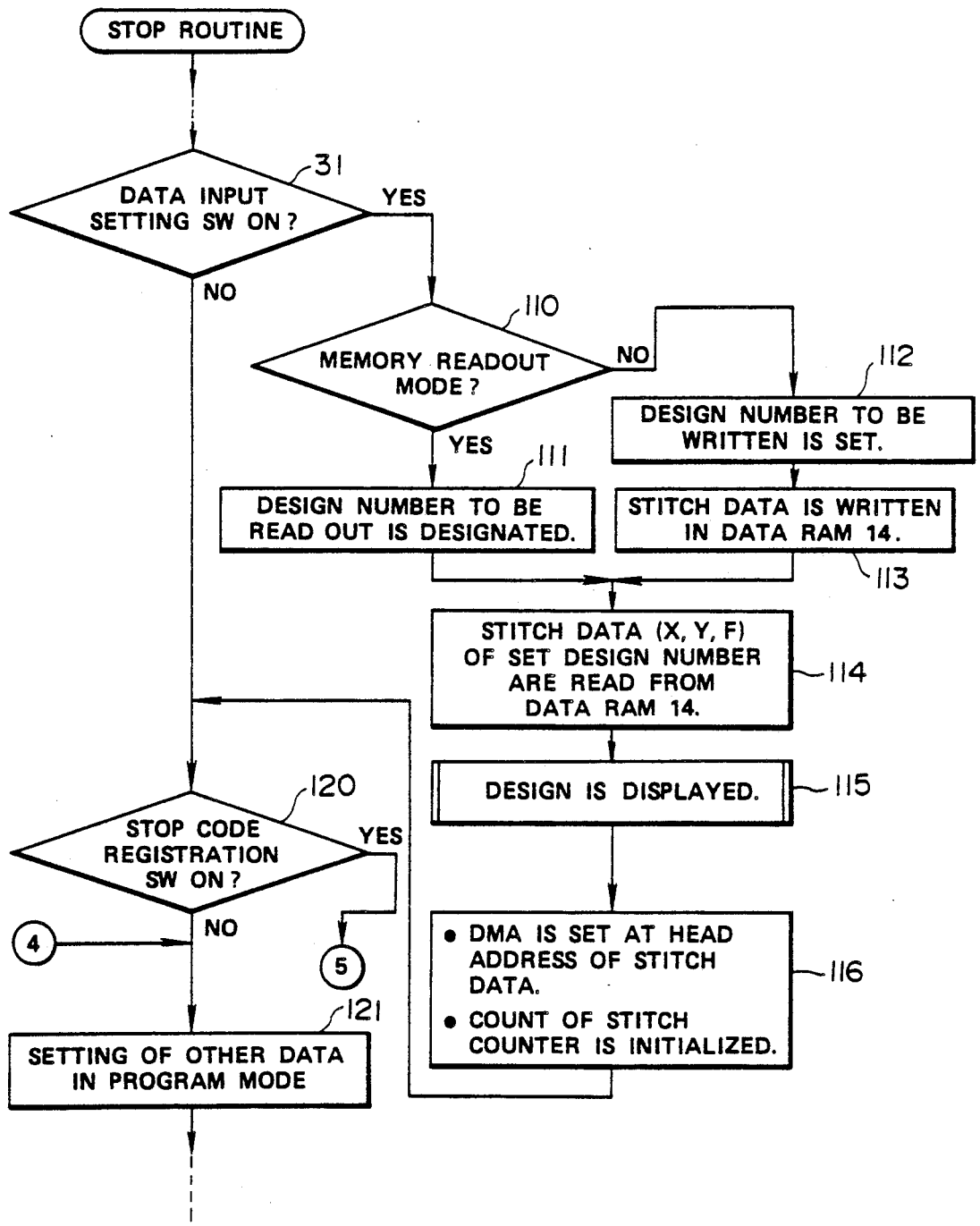
FIGS. 25a and 25b are flow charts showing an example of embroidering machine main shaft stop routine in this embodiment which are modified example of FIGS. 6a and 6b.
Figure 25B:
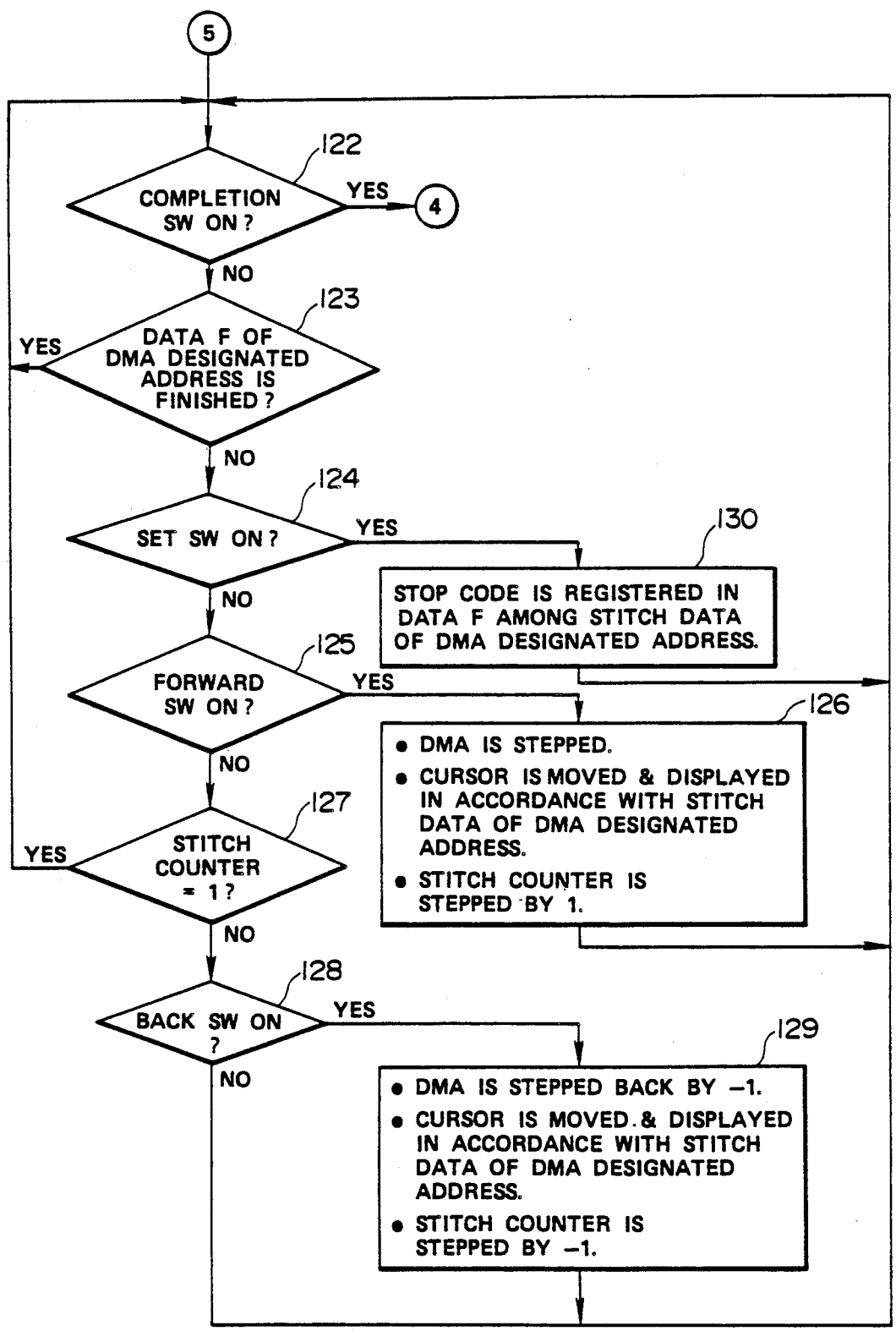

FIGS. 25a and 25b which are modified examples of FIGS. 6a and 6b show an example of the stop routine for carrying out this embodiment. In step 31, the same processing as in the step of the same reference numeral in FIG. 6a is executed. If step 31 is YES, "data input subroutine" is executed as described above. In FIG. 25a, the processings of steps 110-116 correspond to "data input subroutine".

In FIG. 25a, in step 110, as in step 55 in FIG. 8, whether or not "memory readout mode" exists is examined. If result is YES, the processing proceeds to step 111 in which inputting for designating the design number of a desired embroidery design to be read from the data RAM 14 is executed. If the mode is "memory write mode", the processing proceeds to step 112 in which the desired design number is set. In next step 113, as in step 57 of FIG. 8, stitch data read from a paper tape 17 or the like is written in the data RAM 14 and stored therein.

In step 114, stitch data (X, Y data and function data F) of the design number designated or set in step 111 or 112 are sequentially read, stitch by stitch, from the data RAM 14. In next step 115, the embroidery design corresponding to the read out stitch data is displayed by the display DPY.

A specific example of the processing in this step 115 is shown in FIG. 26. Referring to FIG. 26, in step 117, an operation for obtaining coordinate position (Xa, Ya) of each stitch on the screen of the display DPY is made on the basis of X, Y data in the stitch data read stitch by stitch from the data RAM 14, graphic data of a series of embroidery design is made in accordance with these coordinate positions (Xa, Ya) of the respective stitches and this graphic data is stored in the graphic memory GPM. In accordance with this graphic data stored in the graphic memory GPM, the embroidery design pattern corresponding to the selected embroidery design is displayed in the display DPY. In next step 119, the cursor on the screen of the display DPY is displayed at the start point of the embroidery design and the processing returns.

Reverting to FIG. 25a, in step 116, data memory address DMA for reading out stitch data from the data RAM 14 is set at the head address of stitch data of the selected embroidery design for preparing for reading at the start of running and also initializing count of the stitch counter (i.e., setting the count at the starting point of the stitch data=stitch 1). The "data input subroutine" is thus finished and the processing proceeds to step 120.

In next step 120, whether or not the stop code registration switch SW10 has been turned on is examined. As described above, when "stop code" for designating changing of color of thread etc. as function data corresponding to a desired stitch is set and registered, this stop code registration switch SW10 is turned on to select "stop code registration mode" and the processing proceeds to step 122 (FIG. 25B). If result is NO, the processing proceeds to step 121.

In step 121, setting of other data in the program mode is executed. This step 121 corresponds to steps 33-47 of FIGS. 6a and 6b. After step 121, a processing corresponding to step 50 of FIG. 6b is executed of which illustration is omitted.

Description will be made about a case where an editing work such as changing of stitch data is made while watching an embroidery design displayed in the display DPY. The following example is one in which an editing work of setting and registering "stop code" for changing color of thread as function data at a desired stitch is executed.

Figure 25C:
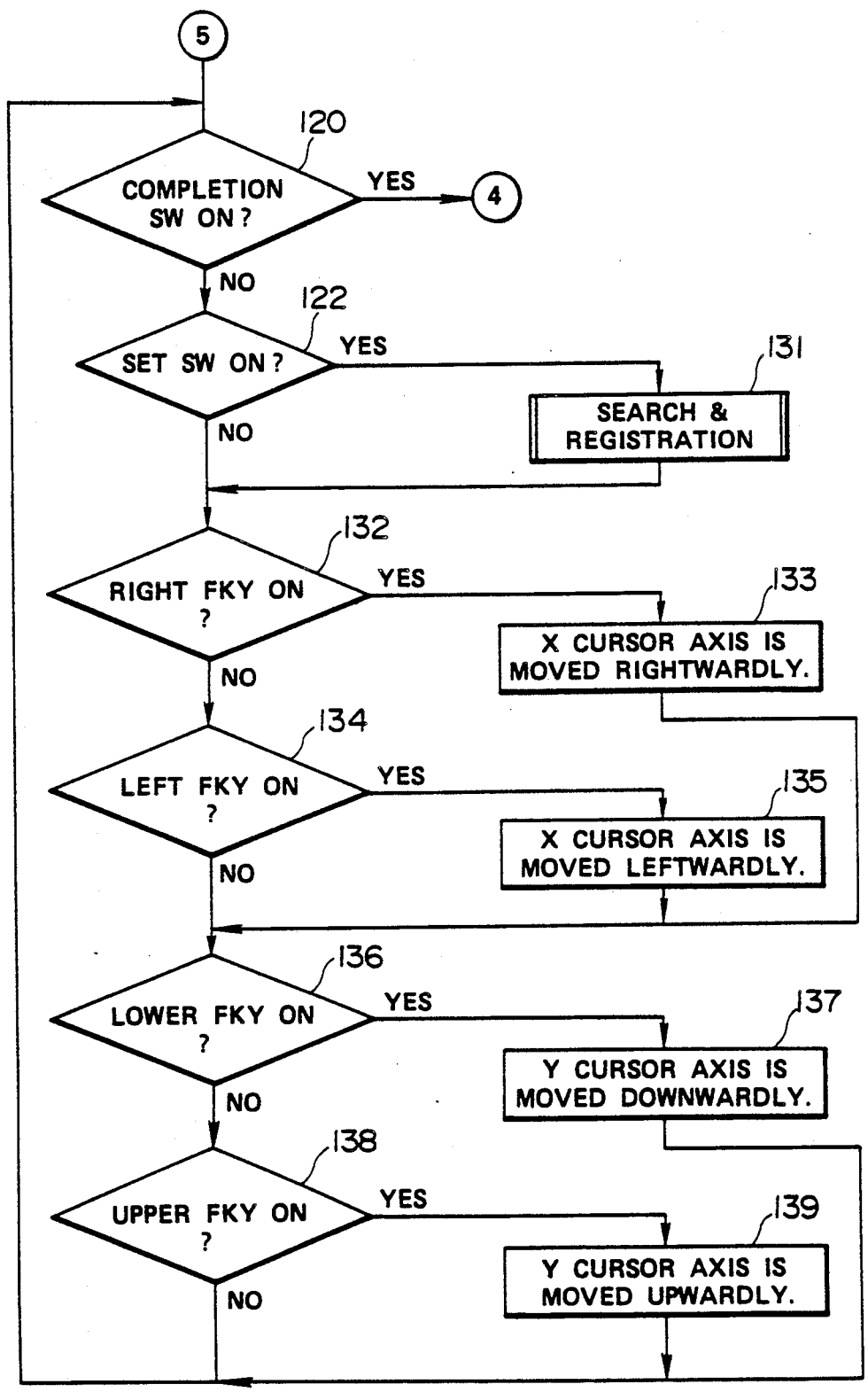

As described above, in the memory readout mode or memory write mode, the design number of a desired embroidery design is designated or set and the design pattern is displayed by the display DPY (steps 110-116 in FIG. 25a). It is assumed that, in this state, the design pattern is displayed as shown, for example, in FIG. 28 in which the color of thread is changed at point a and point b. If it is desired to further change the color of thread at a desired stitch, e.g., at point c, the above described stop code registration switch SW10 is turned on. Thereupon, step 120 of FIG. 25a becomes YES and the processing proceeds to step 122 of FIG. 25c. Since FIG. 25c is a modified example of FIG. 25b, FIG. 25b will be described first.

In step 122, whether or not a predetermined function switch among the function switches F1-F6 which functions as a completion switch has been turned on is examined. The completion switch is a switch operated when this stop code registration processing is to be completed. This completion switch is initially not ON and the processing proceeds to step 123. If the completion switch has been turned on, the processing returns to step 121 (FIG. 25a) in which other processings of the program mode are executed.

In step 123, whether or not the function data F in the stitch data read from the data RAM 14 in correspondence to the address designated by the data memory address DMA is "end code" representing finish of the design is examined. Since the function data is not the "end code" yet initially, this step 123 is NO and the processing proceeds to step 124.

In step 124, whether or not the set switch SW5 has been turned on is examined. The set switch SW5 is turned on when "stop code" is registered.

Initially, the cursor display in the display DPY is positioned at the start point of the embroidery design. This cursor display is moved to a position corresponding to a desired stitch (e.g., to the point c in FIG. 28 if this point c is the desired position) by operation of the forward switch SW11 and the back switch SW12 and the "stop code" is registered in correspondence to the stitch by turning on the set switch SW5 in this state.

Accordingly, if the cursor display is not at the desired position, the set switch SW5 is not turned on so that step 124 is NO and the processing proceeds to step 125.

In step 125, whether or not the forward switch SW11 has been turned on is examined. If the switch SW11 is ON, this step 125 becomes YES and the processing proceeds to step 126. If the switch SW11 is not ON, the processing proceeds to step 127.

In step 126, value of the data memory address DMA is stepped by +1 and, in accordance with stitch data (X, Y) designated by this data memory address DMA, the cursor position is moved to next stitch position by one stitch. Nextly, the value of the stitch counter is stepped by +1 and the processing returns to step 122. The value of this stitch counter is numerically displayed to display the order of stitch of the current stitch.

In step 127, whether or not the value of the stitch counter is the initial value=1 is judged. If the value of the stitch counter is the initial value=1, this step 127 becomes YES and the processing returns to step 122. If the value is not the initial value=1, the processing proceeds to step 128. This is because the back switch SW12 should be invalid at the start point.

In step 128, whether or not the back switch SW12 has been turned on is judged. If the switch SW12 is ON, the step 128 becomes YES and the processing proceeds to step 129. If the switch SW12 is not ON, the processing returns to step 122.

In step 129, the value of the data memory address DMA is stepped back by −1 and the cursor position is moved back to the preceding position by one stitch in accordance with the stitch data (X, Y) designated by the data memory address DMA. Then, the value of the stitch counter is stepped back by −1 and the processing returns to step 122. The value of the stitch counter is numerically displayed to display the order of the current stitch.

In the foregoing manner, the cursor position on the screen of the display DPY is moved to the desired stitch position in the embroidery design display by operation of the forward switch SW11 or back switch SW12. When the cursor has arrived at the desired stitch position, the set switch SW5 is turned on and the processing proceeds to step 130. At this time, the data memory address DMA designates an address in the data RAM 14 corresponding to the cursor position. In step 130, the "stop code" is registered as the function data F among the stitch data (X, Y, F) stored at the address designated by the data memory address DMA in the data RAM 14.

Upon completion of registration of the "stop code" with respect to all desired stitches, the completion switch is turned on whereby the stop code registration processing shown in FIG. 25b is completed.

Reduced display or scrolling of the screen may be made so that the embroidery design will be displayed within the frame of the screen of the display DPY.

FIG. 25c is a modified example of FIG. 25b. In the example of FIG. 25c, the forward switch SW11 and the back switch SW12 are not used. In this case, four cursor key switches are used for moving the cursor position vertically and transversely on the screen. As these four cursor key switches, frame moving key switches FKY (FIG. 3) may be used. The four frame moving key switches FKY will be described below as upper cursor key (upper FKY), lower cursor key (lower FKY), right cursor key (right FKY) and left cursor key (left FKY).

Figure 27:
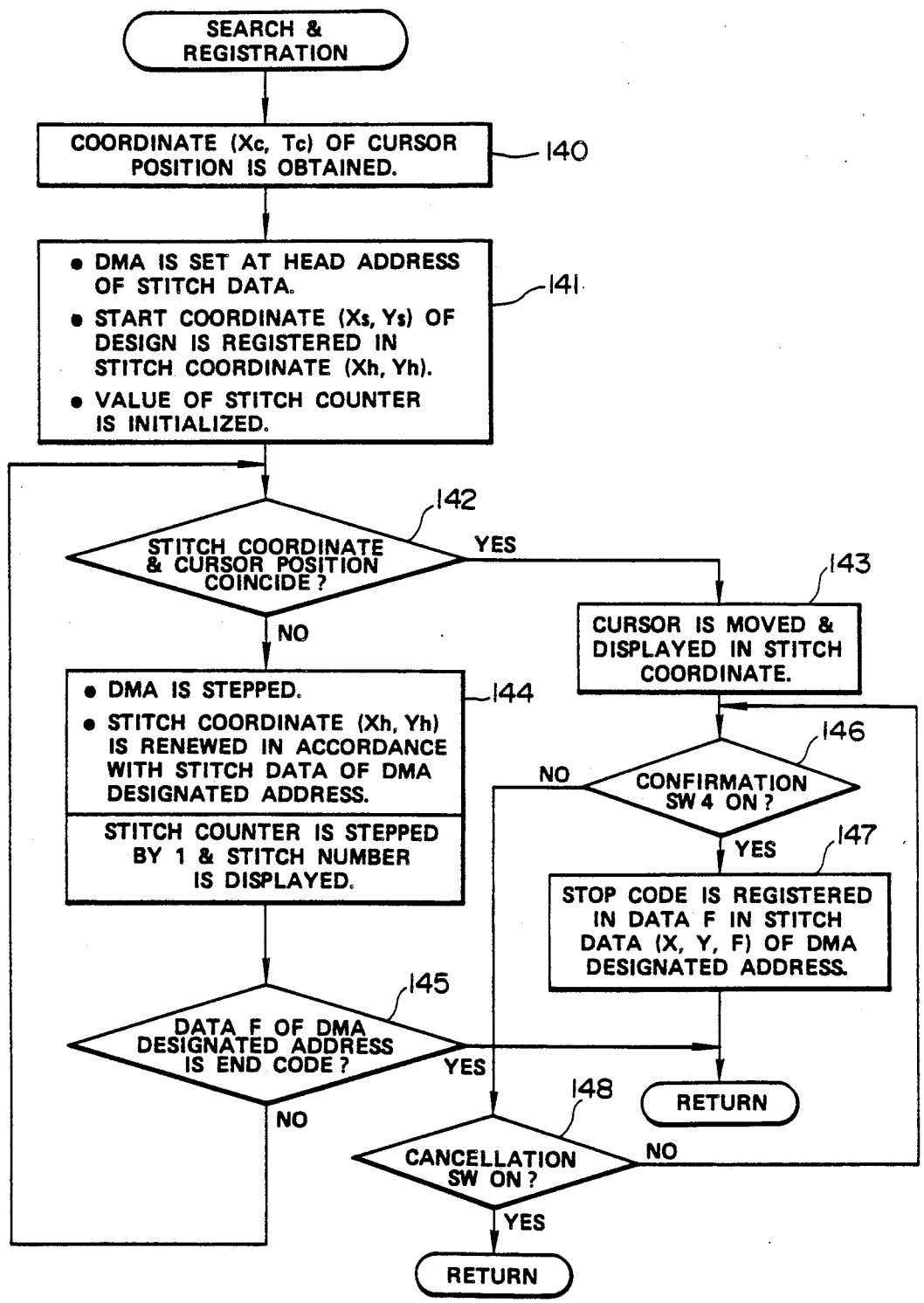
FIG. 27 is a flow chart showing an example of search and registration routine in FIG. 25c.

First, in the same manner as described above, step 122 is executed. Nextly, in step 124, whether or not the set switch SW5 has been turned on is examined in the same manner as described above. If the set switch SW5 is ON, i.e., the "stop code" is registered, the processing proceeds to step 131 in which search and registration processing subroutine of which details are shown in FIG. 27 is executed. If the "stop code" is not registered yet, the processing proceeds to step 132.

In step 132, whether or not the right cursor key (right FKY) has been turned on is judged. If the right cursor key is ON, the processing proceeds to step 133 in which X cursor axis on the screen of the display DPY is moved rightwardly. In this case, the cursor display is made up of vertically extending X cursor axis and transversely extending Y cursor axis which crosses with the X cursor axis, the crossing point of the two axes constituting the cursor position.

In step 134, whether or not the left cursor key (left FKY) has been turned on is judged. If the left cursor key is ON, the processing proceeds to step 135 in which the X cursor axis on the screen of the display DPY is moved leftwardly.

In step 136, whether or not the lower cursor key (lower FKY) has been turned on is judged. If the lower cursor key is ON, the processing proceeds to step 137 in which the Y cursor axis on the screen of the display DPY is moved downwardly.

In step 138, whether or not the upper cursor key (upper FKY) has been turned on is judged. If the upper cursor key is ON, the processing proceeds to step 139 in which the cursor axis on the screen of the display device DPY is moved upwardly.

By operating the cursor keys in this manner, the cursor position on the screen of the display DPY is moved to the desired stitch position in the embroidery design display. When the cursor has moved to the desired stitch position, the set switch SW5 is turned on and the processing proceeds to step 131. In the case of this example, which stitch position the cursor position corresponds to is not known yet. Therefore, by the processing of step 131 shown in FIG. 27 in detail, search is conducted to detect which stitch position the cursor position corresponds to.

In the search and registration routine of FIG. 27, in step 140, the coordinate of the crossing point (Xc, Yc) of X cursor axis and Y cursor axis is obtained as the coordinate of the cursor position.

In step 141, the data memory address DMA is set at the head address of the stitch data. Absolute address on the screen corresponding to start coordinate (Xs, Ys) of the embroidery design on screen is registered as the stitch coordinate (Xh, Yh) and the value of the stitch counter is initialized to "1".

In next step 142, whether or not the stitch coordinate (Xh, Yh) and the cursor position coordinate (Xc, Yc) coincide with each other within a predetermined error range is examined. If the stitch coordinate and the cursor position coordinate coincide with each other within the predetermined error range, this step 142 becomes YES and the processing proceeds to step 143. If the stitch coordinate and the cursor position coordinate do not coincide with each other within the predetermined error range, the processing proceeds to step 144.

In step 144, the value of the data memory address DMA is stepped and the value of the stitch coordinate (Xh, Yh) is renewed in accordance with the X, H data in the stitch data of the stitch designated by the data memory address DMA. More specifically, X, Y data (values converted to coordinate values on the screen) for next one stitch is added to or subtracted from the stitch coordinate (Xh, Yh) of the preceding stitch thereby to obtain the absolute value of next stitch on the screen. Further, contents of the stitch counter are brought to +1. Again, the value of the stitch counter is numerically displayed to display the current order of the stitch.

In step 145, whether or not the function data of the stitch data of the stitch designated by the data memory address DMA is the "end code" is judged. If the function data is the end code, this step becomes YES and the processing returns to the routine of FIG. 25c. If the function data is not the end code, this step becomes NO and the processing returns to step 142 in which the above described processings up to step 145 are repeated.

Thus, the stitch coordinate (Xh, Yh) is moved stitch by stitch until the stitch coordinate and the cursor position coordinate coincide with each other within the predetermined error range when step 142 becomes YES and the processing proceeds to step 143. In step 143, the cursor display is moved so that the cursor position coincides completely with the current stitch coordinate (Xh, Yh). At this time, the data memory address DMA designates an address in the data RAM 14 for stitch corresponding to the cursor position.

In step 146, whether or not a confirmation switch SW4 has been turned on is examined. If it has been confirmed that the cursor display corresponds to the desired stitch, this switch SW4 is turned on and the processing proceeds to step 147. In step 147, the "stop code" is registered as the function data F in the stitch data (X, Y, F) stored at the address in the data RAM 14 designated by the data memory address DMA. Then, the processing returns to the routine of FIG. 25c.

If the confirmation switch SW4 is not ON, the processing proceeds to step 148 in which whether or not a cancellation switch is ON is examined. The function of the cancellation switch is assigned to a predetermined one of the function switches F1-F6. If the cancellation switch is ON, this step 148 becomes YES and the processing returns to the routine of FIG. 25c. If the cancellation switch 148 is not ON, this step 148 becomes NO and the processing returns to step 146.

In this embodiment, the "stop code" is registered as the function data corresponding to a desired stitch. The invention is not limited to this but "stop code" which has already been registered may be cancelled. Function data which can be edited is not limited to "stop code" but it may be other function data such as "jump code". Further, X, Y data may be changed or modified.

As described above, according to the invention, a set of control data is stored for each individual embroidery design and, when a desired embroidery design is to be embroidered, a set of control data corresponding to this embroidery design is read out and changing of stitch data and control of the embroidering operation for this embroidery design are made in accordance with the read out data. It is therefore unnecessary to change setting of control data each time the embroidery design is changed and, by simply selecting a desired embroidery design, a set of control data which has been preset for this embroidery design is obtained. This alleviates burden on the operator in setting control data and improves efficiency in the embroidery work.

Further, according to the invention, stitch data for plural embroidery designs picked up from an external recording device are combined to continuous stitch data corresponding to a single embroidery design and registered in a memory and the embroidering operation can be executed by simply selecting this single design consisting of this combination. This eliminates the troublesome selection of an embroidery design and setting of the running conditions for each stitch data recorded on each paper tape whereby the efficiency and accuracy of the embroidery work can be improved. Further, a complicated device for realizing editing of an embroidery design is not required and the operator is released from the troublesome operation for editing data.

Further, according to the invention, stitching operation is temporarily stopped during execution of an embroidering operation in response to stitch data corresponding to a desired embroidery design and the embroidering operation is resumed after editing contents of stitch data of a desired stitch. Therefore, editing of stitch data such as change, deletion and insertion can be made in a simple manner while confirming acutal embroidery design in the course of the embroidering operation. Accordingly, the efficiency of data editing work in the embroidery work can be improved.

Further, according to the invention, an embroidery design is displayed on a screen of display means, a desired stitch position is designated while confirming the embroidery design on the screen of the display means and data editing such as change or modification of stitch data corresponding to this stitch position is executed. Accordingly, data editing such as change or modification of stitch data can be made promptly and simply.

Furthermore, according to the invention, transmission and receiving of stitch data and respective control data for changing stitch data or controlling the embroidering operation concerning each embroidery design can be made between the embroidering machine and an external device through a communication interface. Therefore, when a desired embroidery design is to be embroidered, respective control data for this embroidery design are input from the external device such as a computer through the communication interface and changing of stitch data for this embroidery design and controlling of the embroidering operation are effected in accordance with these control data. Accordingly, it is not necessary to change setting of control data each time the embroidery design is changed but stitch data and control data for the embroidery design can be supplied from the external device such as a computer by simply selecting a desired embroidery design. This alleviates burden on the operator for setting control data and improves efficiency of the embroidery work. Again, by transferring stitch data and control data stored in the memory of the embroidering machine to the external device through the communication interface, various processings including a complex data editing work which the embroidering machine cannot readily handle can be executed in the external device.

What is claimed is:

1. An embroidering machine, comprising:
   stitch data memory means for storing stitch data for realizing an embroidering operation corresponding to a desired embroidery design;
   embroidering operation execution means for executing the embroidering operation in accordance with stitch data read out from said stitch data memory means; and
   stitch data modifying means for modifying said stitch data, said stitch data modifying means comprising:
   control data setting means for setting respective control data for changing the stitch data or for controlling the embroidering operation associated with the stitch data;
   control data memory means for storing the control data set by said control data setting means with respect to each embroidery design for which the stitch data is stored in said stitch data memory means; and
   control means for reading the stitch data and control data for the desired embroidery design from said stitch data memory means and said control data memory means, causing said embroidering operation execution means to execute the embroidering operation corresponding to the read out stitch data and controlling change of the stitch data and the embroidering operation in accordance with the read out control data.

2. An embroidering machine as defined in claim 1 wherein the respective control data include data designating the order of changing color of thread and parameter data for converting data designating moving amount of an embroidery frame in X and Y directions in the stitch data.

3. An embroidering machine as defined in claim 1 which further comprises:
   communication interface means for enabling transmission and receiving of the stitch data and the control data between the embroidering machine and an external device; and
   communication control means for writing stitch data and control data received from the external device through said communication interface means in said stitch data memory means and said control data memory means and reading stitch data and control data to be transmitted to the external device through said communication interface means from said stitch data memory means and said control data memory means.

* * * * *